United States Patent [19]
Kanota et al.

[11] Patent Number: 5,991,500
[45] Date of Patent: Nov. 23, 1999

[54] COPY CONTROL FOR A VIDEO SIGNAL WITH COPYRIGHT SIGNALS SUPERIMPOSED AS PREDETERMINED BITS IN THE VBID DATA OF THE VIDEO SIGNAL

[75] Inventors: Keiji Kanota, Kanagawa; Tadashi Ezaki, Tokyo; Teruhiko Kori; Satoshi Tsuchiya, both of Kanagawa, all of Japan

[73] Assignee: Sony Corporation, Tokyo, Japan

[21] Appl. No.: 08/990,480

[22] Filed: Dec. 15, 1997

Related U.S. Application Data

[62] Division of application No. 08/220,049, Mar. 30, 1994, abandoned.

[30] Foreign Application Priority Data

Apr. 2, 1993 [JP] Japan ................................... 5-077044
Aug. 27, 1993 [JP] Japan ................................... 5-213206

[51] Int. Cl.[6] ................................................ H04N 5/91
[52] U.S. Cl. ................................. 386/94; 380/5; 380/20
[58] Field of Search ................................. 386/94, 95, 46; 360/60, 69; 380/5, 10, 20, 22; 348/464; H04N 5/91

[56] References Cited

U.S. PATENT DOCUMENTS 5,231,546 7/1993 Shimada ..................................... 360/60
5,315,448 5/1994 Ryan ......................................... 386/94
5,337,157 8/1994 Nakata ..................................... 386/94

*Primary Examiner*—Tommy P. Chin
*Assistant Examiner*—Y. Lee
*Attorney, Agent, or Firm*—Frommer Lawrence & Haug, LLP.; William S. Frommer

[57] ABSTRACT

A video signal is processed to selectively permit copying by superposing in that portion of the video signal which does not contain useful picture information a copyright information signal indicative of whether the viewable picture that is displayed from the video signal is subject to copyright and a copy generation signal indicative of the number of successive generations of copies that can be made from the video signal.

60 Claims, 22 Drawing Sheets

COPY CONTROL FOR A VIDEO SIGNAL WITH COPYRIGHT SIGNALS SUPERIMPOSED AS PREDETERMINED BITS IN THE VBID DATA OF THE VIDEO SIGNAL

This is a divisional of U.S. application Ser. No. 08/220,049, filed Mar. 30, 1994 abandoned.

BACKGROUND OF THE INVENTION

This invention relates to copy protection of a video signal and, more particularly, to a technique for superposing on that portion of the video signal which does not contain useful picture information copy protection information which includes information representing the number of successive generations of copies that can be made from the video signal.

Various techniques and formats have been proposed to prevent video signals from being copied, or dubbed, without authorization. For example, it is preferable in many environments to permit a video signal to be displayed as a video picture on, for example, a television monitor, but to prevent that same video signal from being recorded by a video recorder. The video signal may be transmitted via cable, direct satellite broadcast (DSB) or over-the-air; or the video signal may be recorded on a video tape or a video disk. In the field of sales or rentals of video tapes and video disks, substantial amounts of revenues will be lost if a user is permitted to make a copy of the video program on a video tape or disk, thereby depriving the originator or distributor of the video tape or video disk of additional sales or rentals. Even though the unlawful re-recording or dubbing of such video programs may constitute copyright infringement, the threat of prosecution therefor presents little if any deterrent to such unlawful copying. Consequently, more positive approaches have been adopted to prevent a user from making an unauthorized copy of a video program in the form of a video recording thereof.

In one anti-copying scheme the video signal is modified to defeat the satisfactory operation of a typical video recorder yet still permit the display of an acceptable video picture therefrom. This is achieved by reducing the number of vertical synchronizing pulses included in the vertical blanking interval, thereby defeating the servo locking operation of the typical video recorder but permitting adequate detection of the vertical synchronizing pulses in the usual television receiver sync detector. In another proposal high amplitude pulses are inserted into a normally blank line interval of the vertical blanking interval so as to cause the usual automatic gain control (AGC) circuitry in a typical video recorder to reduce the recording level of the signal recorded thereby, resulting in a recorded video signal whose amplitude is effectively zero.

As yet another example, it has been proposed to superpose a copy inhibit pulse on, for example, the equalizing or vertical synchronizing pulses normally included in the vertical blanking interval and to include in the recording channel of a video recorder a detector which operates to inhibit the recorder from operating in a record mode upon detecting this inhibit pulse.

While there is merit to each of the foregoing proposals, none of them addresses the problem of permitting one copy of the video signal from being made but prohibiting the copy from being copied further. In many situations it may be desirable to permit a consumer to make one copy directly from a video signal (whether that video signal is broadcasted or reproduced from a video tape or video disk) but the number of successive generations of copies is to be controlled. For example, a first generation may be permitted but a second generation may be prohibited. As another example, first and second generations may be permitted but a third generation may not (i.e. a recording and a re-recording may be permitted but a re-re-recording may be prohibited). In the foregoing copy protection schemes, if a video signal is permitted to be copied, a copy of the copied signal may be made and successive generations likewise may be made. But if a video signal is prohibited from being copied, even a single generation copy cannot be made. That is, prior proposals have not considered what is referred to herein as a serial copy management system (SCMS).

OBJECTS OF THE INVENTION

Therefore, it is an object of the present invention to provide an improved technique for controlling the copying of a video signal.

Another object of this invention is to provide video signal copy control by which the number of successive generations of copies that can be made from an input video signal is regulated.

A further object of this invention is to provide a serial copy management system for a video signal, thereby permitting, for example, a copy of an input video signal to be made but a copy of the copy (that is a re-recording of the copy) may be prohibited.

An additional object of this invention is to provide copy protection for a video signal by superposing in that portion of the video signal which does not contain useful picture information both a copyright information signal (which indicates whether the viewable picture that may be produced from the video signal is subject to copyright) and a copy generation signal (which indicates the number of successive generations of copies that can be made from the video signal).

Yet another object of this invention is to provide recording circuitry that detects the aforementioned copyright information and copy generation signals to selectively enable or inhibit recording of the video signal.

Still another object of this invention is to provide a copy generation signal detector which selectively decrements the number of successive generations of copies indicated by the copy generation signal, thereby controlling subsequent re-recording of the video signal.

An additional object of this invention is to provide circuitry included in the playback channel of a video recorder which detects copy protection information contained in the reproduced video signal and which superposes on the reproduced video signal a copyright information signal and a copy generation signal so as to selectively control re-recording of the reproduced video signal.

Various other objects, advantages and features of the present invention will become readily apparent from the ensuing detailed description, and the novel features will be particularly pointed out in the appended claims.

SUMMARY OF THE INVENTION

In accordance with this invention, a video signal is processed to selectively permit copying thereof by superposing on that portion of the video signal which does not contain useful picture information a copyright information signal indicative of whether the viewable picture that is produced from the video signal is subject to copyright and a copy generation signal indicative of the number of successive generations of copies that can be made from the video signal.

In one embodiment, the copyright information and copy generation signals are superposed in respectively different line intervals of the video signal. In another embodiment, the copyright information and copy generation signals are superposed in the same line interval. In a further embodiment, the copyright information signal is superposed in a line interval of one field of a video frame and the copy generation signal is superposed in a line interval of the other field of that frame. In a still further embodiment, the copyright information and copy generation signals are superposed in different line intervals in the same field. Preferably, the copyright information and copy generation signals are superposed in the vertical blanking interval of the video signal.

As an aspect of this invention, the video signal having the copyright information and copy generation signals superposed thereon is recorded on a record medium.

As another aspect of this invention, a video recorder that is supplied with the video signal having the copyright information and copy generation signals superposed thereon is selectively inhibited depending upon the information conveyed by the superposed signals. In one embodiment, if re-recording of the video signal is permitted, the copy information signal that is recorded with the video signal is modified to indicate a decremented number of successive generations of copies that can be made from the recorded video signal. For example, the copy generation signal may be a plural-bit signal indicative of a count, and this count is decremented when the video signal is recorded (or dubbed). Consequently, the number of successive re-recordings may be regulated.

As yet another aspect of this invention, a video signal reproducing channel is provided with a detector for detecting copy protection information that is contained in the reproduced video signal, thereby superposing on that portion of the video signal which does not contain useful picture information the aforementioned copyright information and copy generation signals. Hence, re-recording of the reproduced video signal and successive generations of re-recordings are selectively enabled/inhibited.

Preferably, and notwithstanding the superposed copyright information and copy generation signals, the video signal nevertheless may be readily displayed.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF PREFERRED EMBODIMENTS

Figure 1:
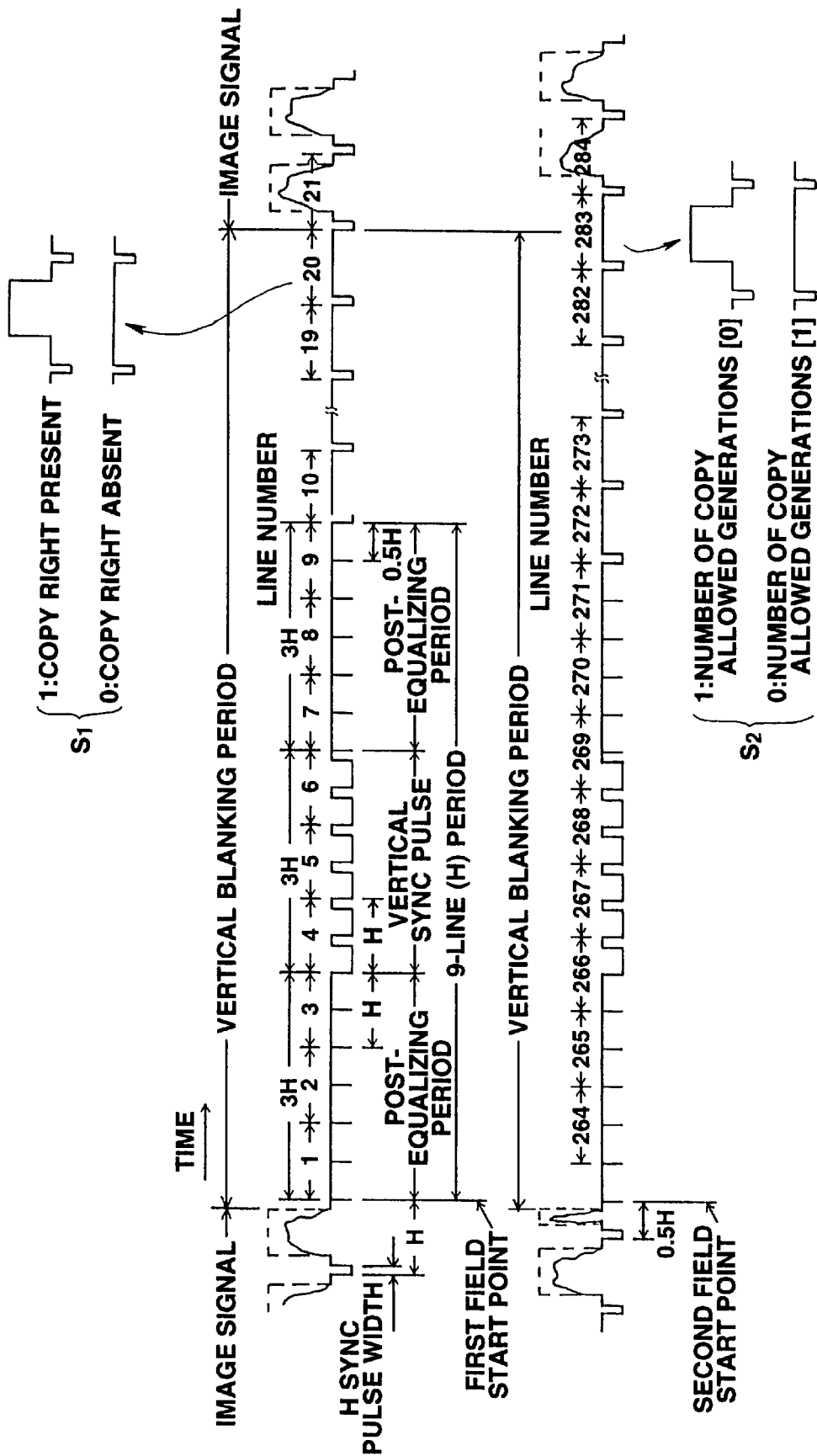
FIG. 1 is a waveform diagram of relevant portions of two fields of a frame of an NTSC video signal containing the copyright information and copy generation signals of the present invention.

Referring to FIG. 1, there is illustrated a portion of each of two fields of a frame of video signals in accordance with the NTSC standard. It is appreciated that each field is divided into an effective picture portion which contains useful picture information, such as line intervals 21, 22, etc. in the first field and line intervals 284, 285, etc. in the second field. Each field interval also includes a non-picture portion which is shown as the vertical blanking period and includes line intervals 1, 2, . . . 19, 20 in the first field and line intervals 264, 265, . . . 282, 283 in the second field. It is recognized that the twentieth line in the first field, i.e. line 20, normally is "blank" and the twentieth line of the second field, i.e. line 283, also normally is blank. In the embodiment illustrated in FIG. 1, a copyright information signal $S_1$ is superposed in line 20 of the first field and a copy generation signal $S_2$ is superposed in line 283 of the second field. That is, the twentieth line interval in each field has superposed therein the copyright information and copy generation signals $S_1$ and $S_2$, respectively. This is shown in greater detail in FIGS. 2 and 3.

In accordance with one embodiment, the copyright information signal $S_1$ is a single bit and when the viewable picture which is reproduced from the video signal is subject to copyright, $S_1=1$. If the viewable picture is not subject to copyright, $S_1=0$.

In the embodiment described herein, the copy generation signal $S_2$ also is formed as a single bit signal. When $S_2=0$, a single generation of the video signal may be recorded; but when $S_2=1$, no generations of the video signal may be made. More particularly, the video signal cannot be recorded if $S_1=1$ and $S_2=1$. Although the copy generation signal shown in FIGS. 1–3 indicates whether one generation or zero generations of the video signal may be made, in other embodiments described below the copy generation signal $S_2$ is a plural-bit signal indicative of a count identifying the number of generations of copies that may be made of the video signal. However, for simplification, it is assumed herein that the copy generation signal $S_2$ simply is a single bit signal.

Figure 2:
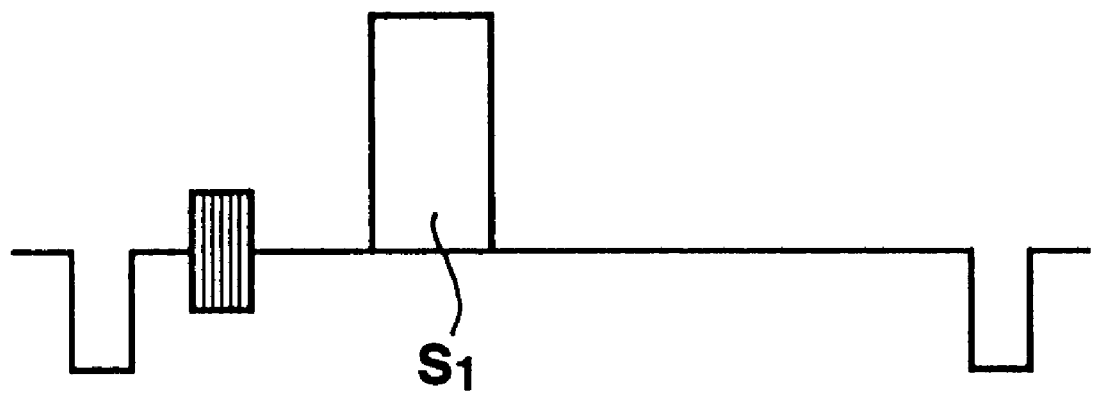
FIGS. 2 and 3 are waveform diagrams illustrating the superposed copyright information and copy generation signals, respectively.
Figure 3:
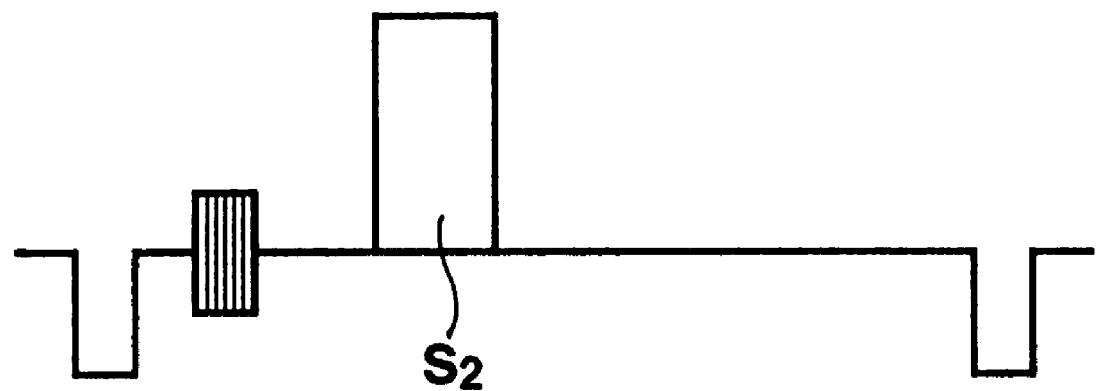

As can be seen from FIGS. 1–3, the copyright information and copy generation signals are recorded in different line intervals in different fields. As will be described, these signals may be recorded in the same line interval in each field or in different line intervals in each field.

Figure 4:
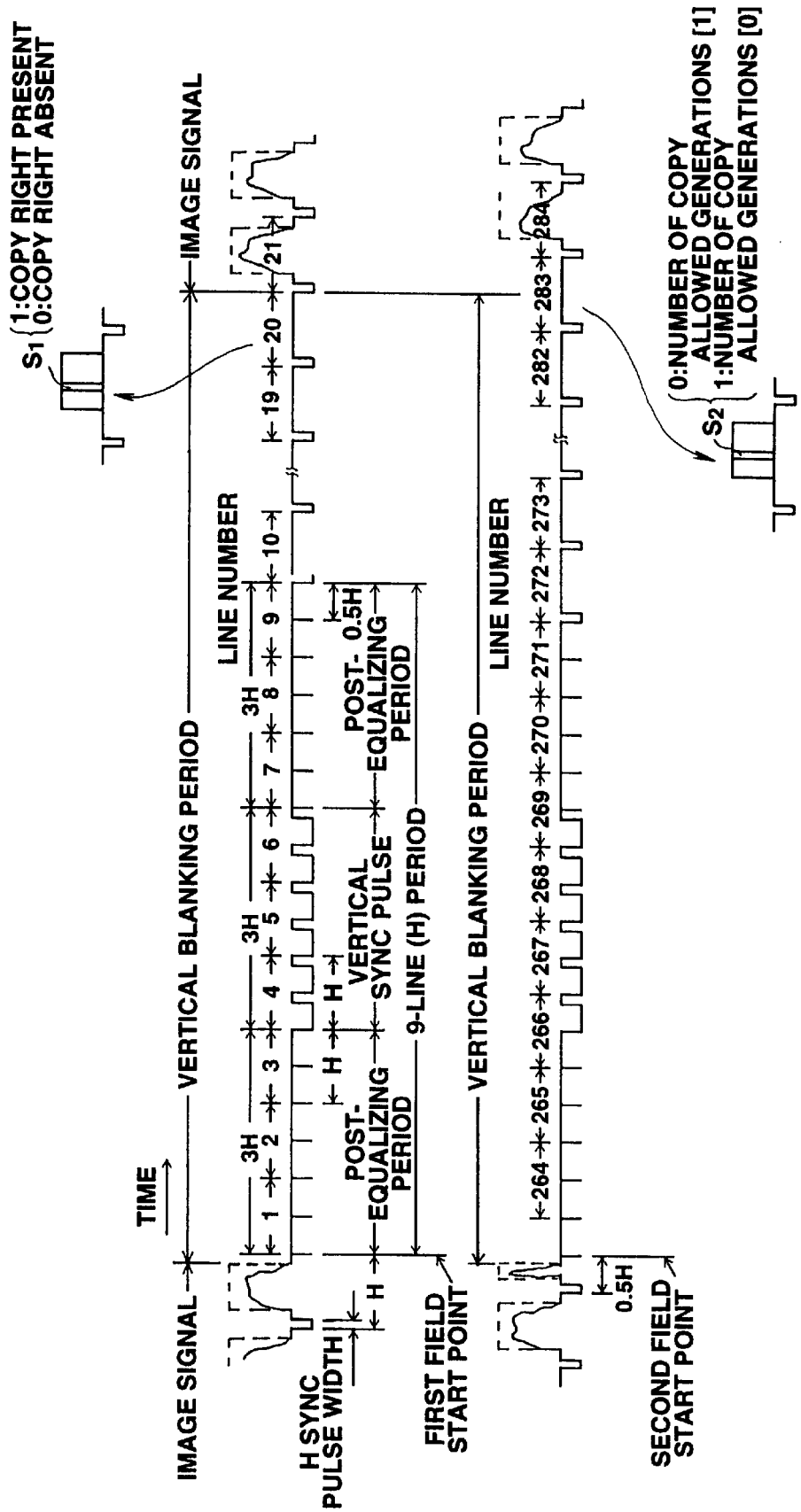
FIG. 4 is a waveform diagram illustrating the superposition of copyright information and copy generation signals as part of identifying data included in a vertical blanking interval (VBID)
Figure 5:
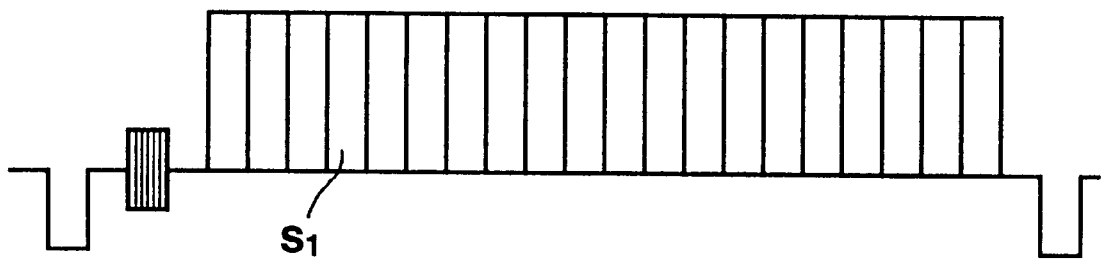
FIGS. 5 and 6 are waveform diagrams of the VBID signals shown in greater detail.
Figure 6:
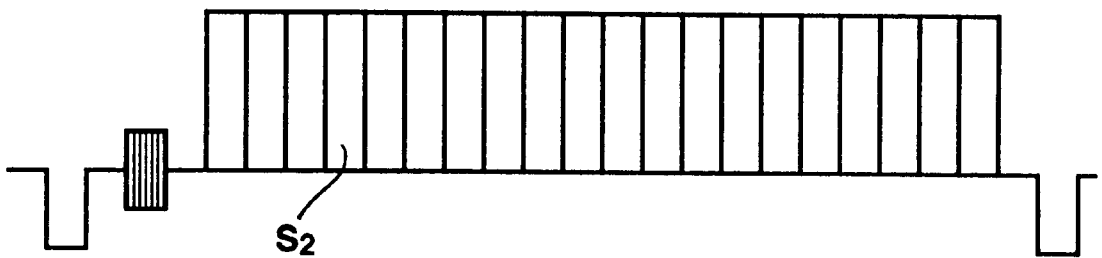

FIGS. 4–6 represent an embodiment similar to that shown in FIGS. 1–3, except that in FIGS. 4–6 copyright information signal $S_1$ and copy generation signal $S_2$ are simply respective ones of several bits representing other data, this data being referred to as vertical blanking interval data (VBID). Here, the VBID data superposed in line 20 of the first field contains the copyright information signal $S_1$ and the VBID data superposed in line 383 of the second field contains copy generation signal $S_2$. As before, $S_1$ and $S_2$ are shown simply as single bit signals.

It will be appreciated that the copyright information and copy generation signals $S_1$ and $S_2$ recorded in lines 20 and 283, respectively, may be readily detected simply by sensing the vertical synchronizing pulses and then counting a suitable number of line intervals thereafter, thus detecting the twentieth line interval in each field. Those of ordinary skill in the art are sufficiently familiar with suitable detecting arrangements by which the twentieth line interval and, thus, the copyright information and copy generation signals may be detected.

Figure 7:
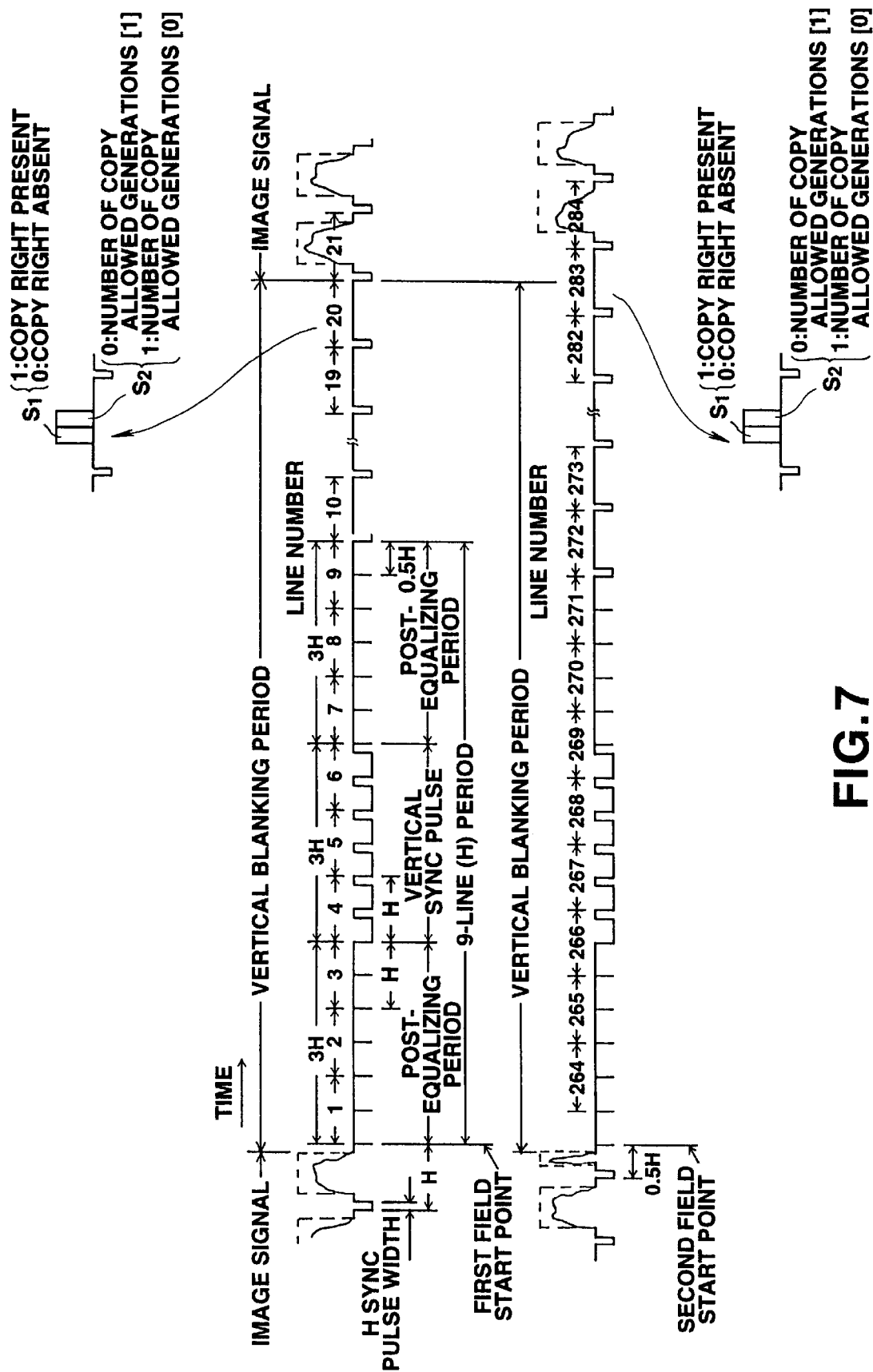
FIG. 7 is a waveform diagram of two fields of an NTSC signal wherein the copyright information and copy generation signals are recorded in the same line interval in each field.
Figure 8:
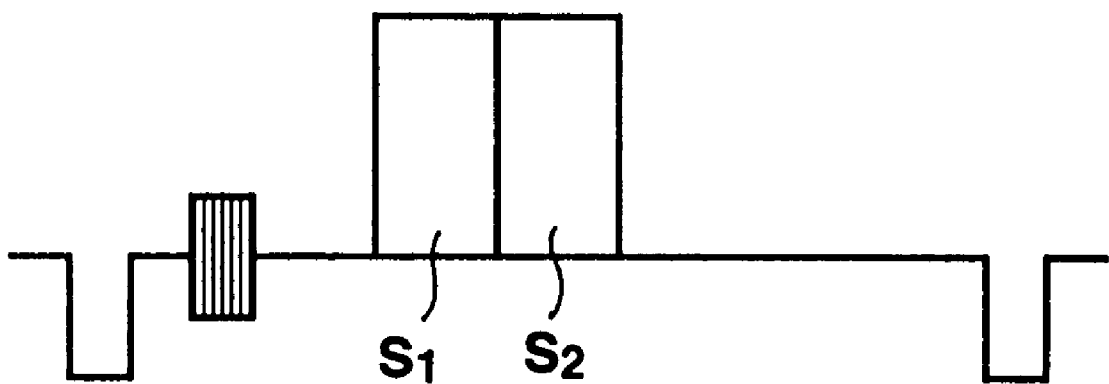
FIG. 8 is a waveform diagram illustrating in greater detail the recording in the same line interval of the copyright information and copy generation signals.

FIG. 7 is similar to FIG. 1, except that in the embodiment shown in FIG. 7, copyright information signal $S_1$ and copy generation signal $S_2$ are recorded in the same line interval. It is seen that the copyright information and copy generation signals are recorded in the twentieth line interval of each field of a frame, namely line 20 of the first field and line 283 of the second field. As shown in FIG. 8, copyright information signal $S_1$ is illustrated as a single bit and copy generation signal $S_2$ likewise is illustrated as a single bit. As before, $S_2=1$ indicates that the picture reproduced from the video signal is subject to copyright; $S_2=0$ indicates that at least one generation of copies may be made of the video signal and $S_2=1$ indicates that no generations of copies may be made from the video signal. Hence, in the example being described, the video signal cannot be recorded when $S_1=1$ and $S_2=1$.

Figure 9:
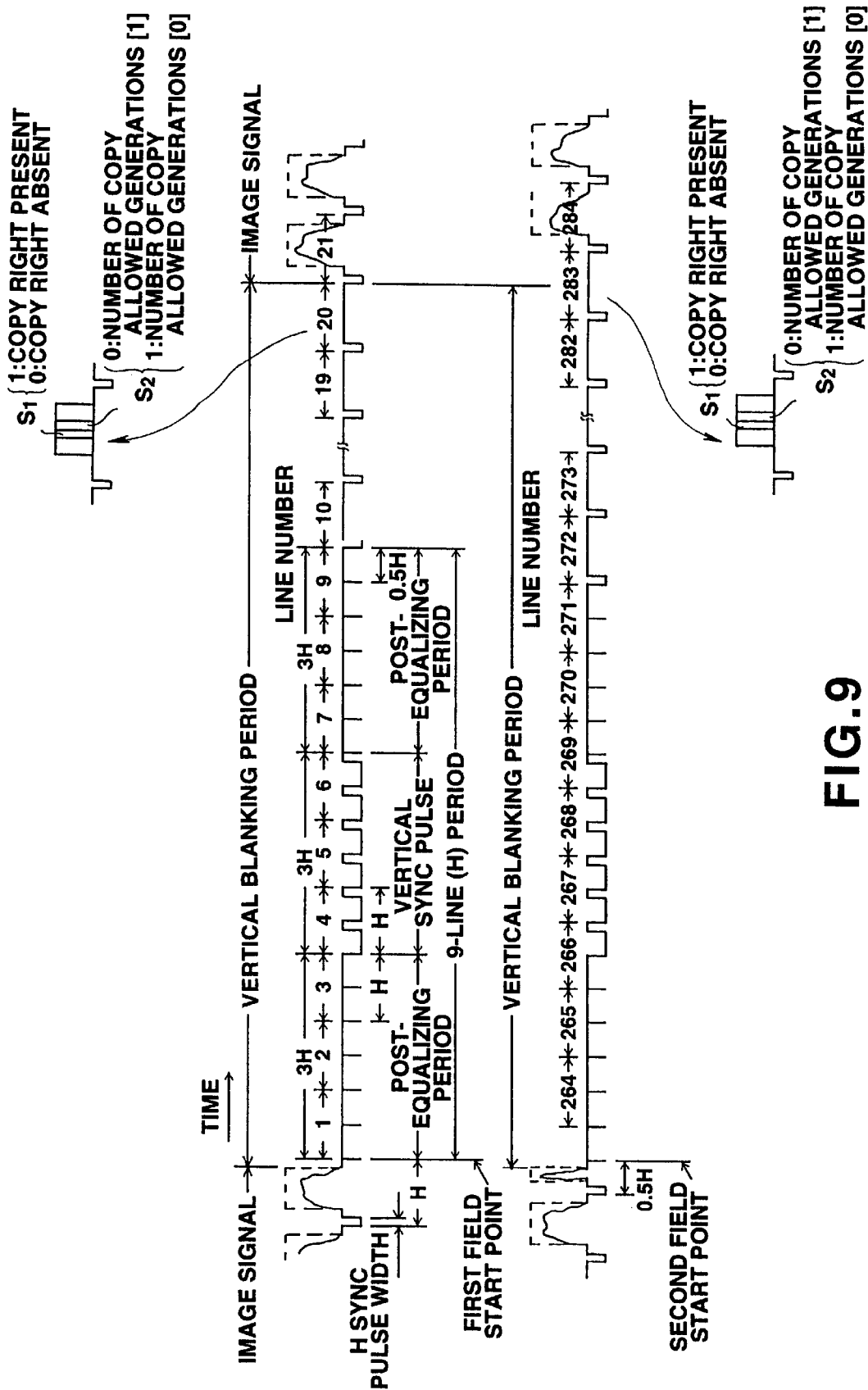
FIG. 9 is a waveform diagram illustrating the incorporation of the copyright information and copy generation signals in VBID data in each field.
Figure 10:
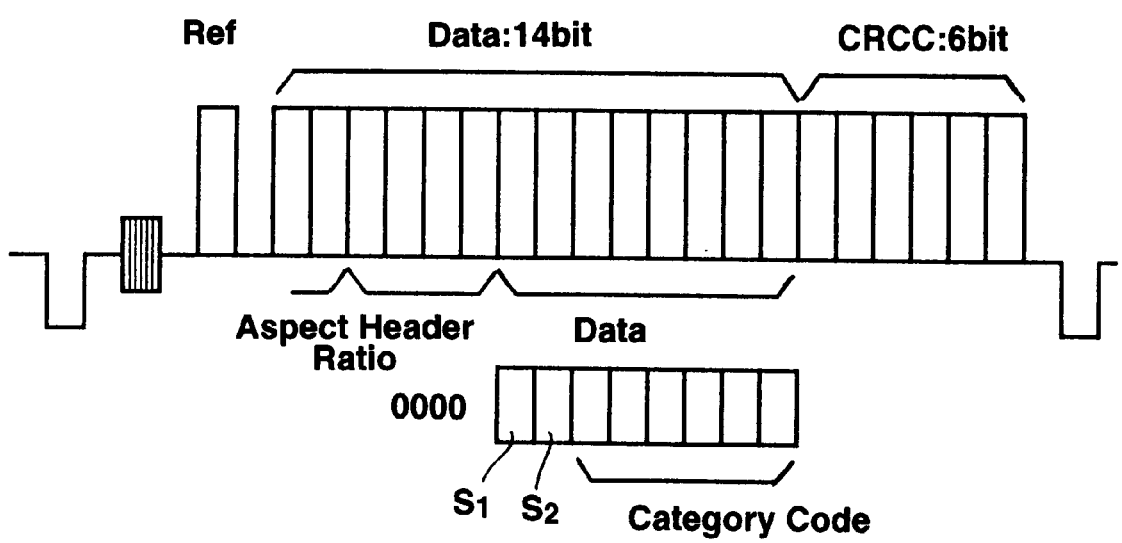
FIG. 10 is a waveform diagram showing in greater detail the copyright information and copy generation signals as part of the VBID data.

FIG. 9 is similar to FIG. 4, except that in the embodiment shown in FIG. 9, the copyright information signal $S_1$ and the copy generation signal $S_2$ both are included in the same VBID code contained in the twentieth line interval of each field. Hence, the VBID code containing the copyright information and copy generation signals $S_1$ and $S_2$ is disposed in line 20 of the first field and in line 283 of the second field. FIG. 10 shows in greater detail the format of the VBID code containing the copyright information and copy generation signals.

Although forming no part of the present invention per se, it will be seen that the VBID code shown in FIG. 10 is comprised of a reference bit used, for example, for synchronization purposes, followed by fourteen bits of data and six bits of an error check code (such as cyclical redundancy check code). The fourteen data bits represent aspect ratio information (e.g. aspect ratios of 16:9 or 4:3), header information which identifies the type of data that is represented by the next-following data bits, and then 8-bit data. It is seen that the first two bits of this 8-bit data represent copyright information and copy generation data and the remaining six bits may be used to convey other information, such as whether the video picture is a three-dimensional (3D) picture, whether title information is being transmitted, etc. The information conveyed by the VBID code, other than the copyright information and copy generation signals are not particularly relevant to the present invention; and in the interest of brevity, further description of the VBID code is not provided herein.

Figure 11:
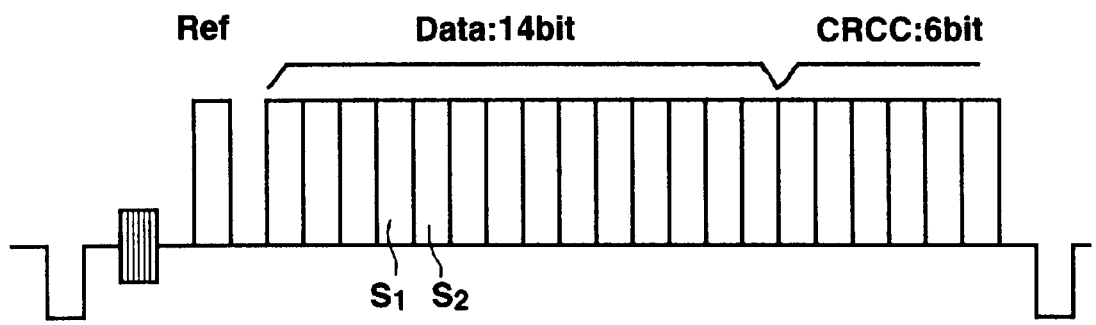
FIGS. 11 and 12 are waveform diagrams of modifications of the waveform diagram shown in FIG. 10.
Figure 12:
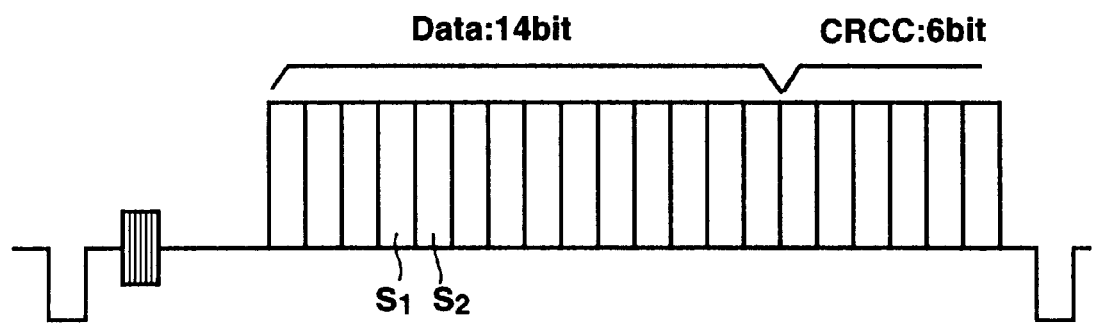

FIGS. 11 and 12 are other examples of VBID formats and illustrate the versatility of the VBID code and the flexibility thereof, namely that the copyright information and copy generation signals may be included at any desired locations of the VBID code, regardless of the particular format of such code. For example, the header information shown in FIG. 10 may be omitted, as represented by FIGS. 11 and 12; and the reference bit shown in FIG. 10 likewise may be omitted as represented by FIG. 12. Nevertheless, since the VBID code is included in a particular line interval of a field, the VBID code may be readily detected; and the presence therein of the copyright information and copy generation signals may be detected. Consequently, a determination of whether the video signal may be copied is made as a function of the values of $S_1$ and $S_2$, as discussed above.

Figure 13:
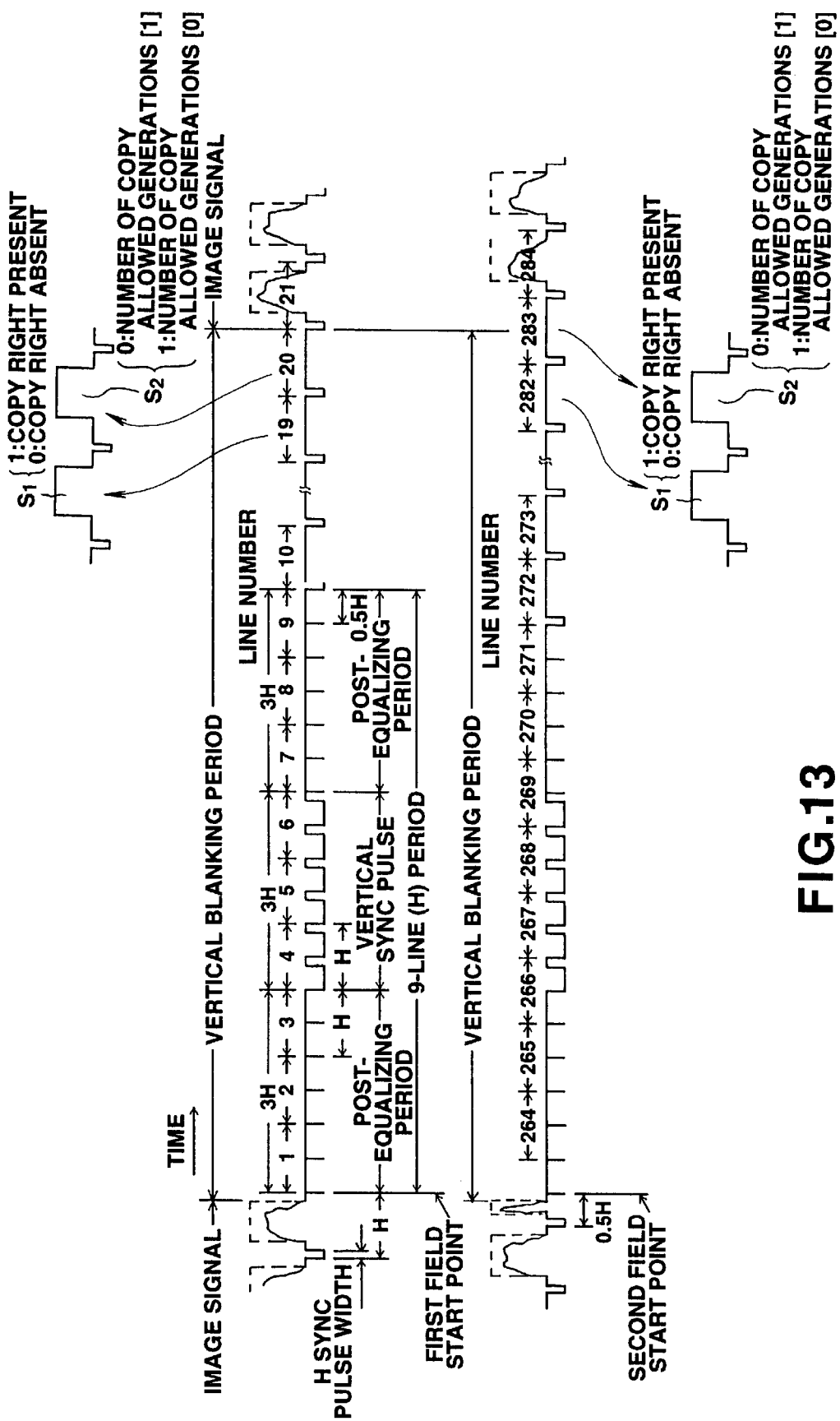
FIG. 13 is a waveform diagram of two fields of a video signal in which the copyright information and copy generation signals are recorded in different line intervals in each field.
Figure 14:
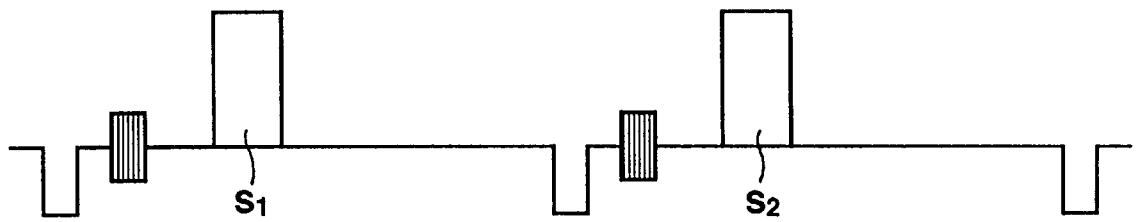
FIG. 14 is a waveform diagram showing in greater detail the recording in different line intervals of the copyright information and copy generation signals.

FIG. 13 is similar to FIG. 1, except that copyright information signal $S_1$ and copy generation signal $S_2$ are included in different line intervals in the same field. More particularly, and as an example, copyright information signal $S_1$ is located in the nineteenth line interval in each field and copy generation signal $S_2$ is located in the twentieth line interval in each field. Hence, copyright information and copy generation signals $S_1$ and $S_2$ are superposed in lines 19 and 20 of the first field and lines 282 and 283 of the second field. As shown in FIG. 14, the copyright information signal $S_1$ is represented as a single bit signal and, similarly, the copy generation signal $S_2$ also is represented as a single bit signal. Although the copyright information signal is shown to precede the copy generation signal, it will be readily apparent that, if desired, this sequence may be reversed.

Figure 15:
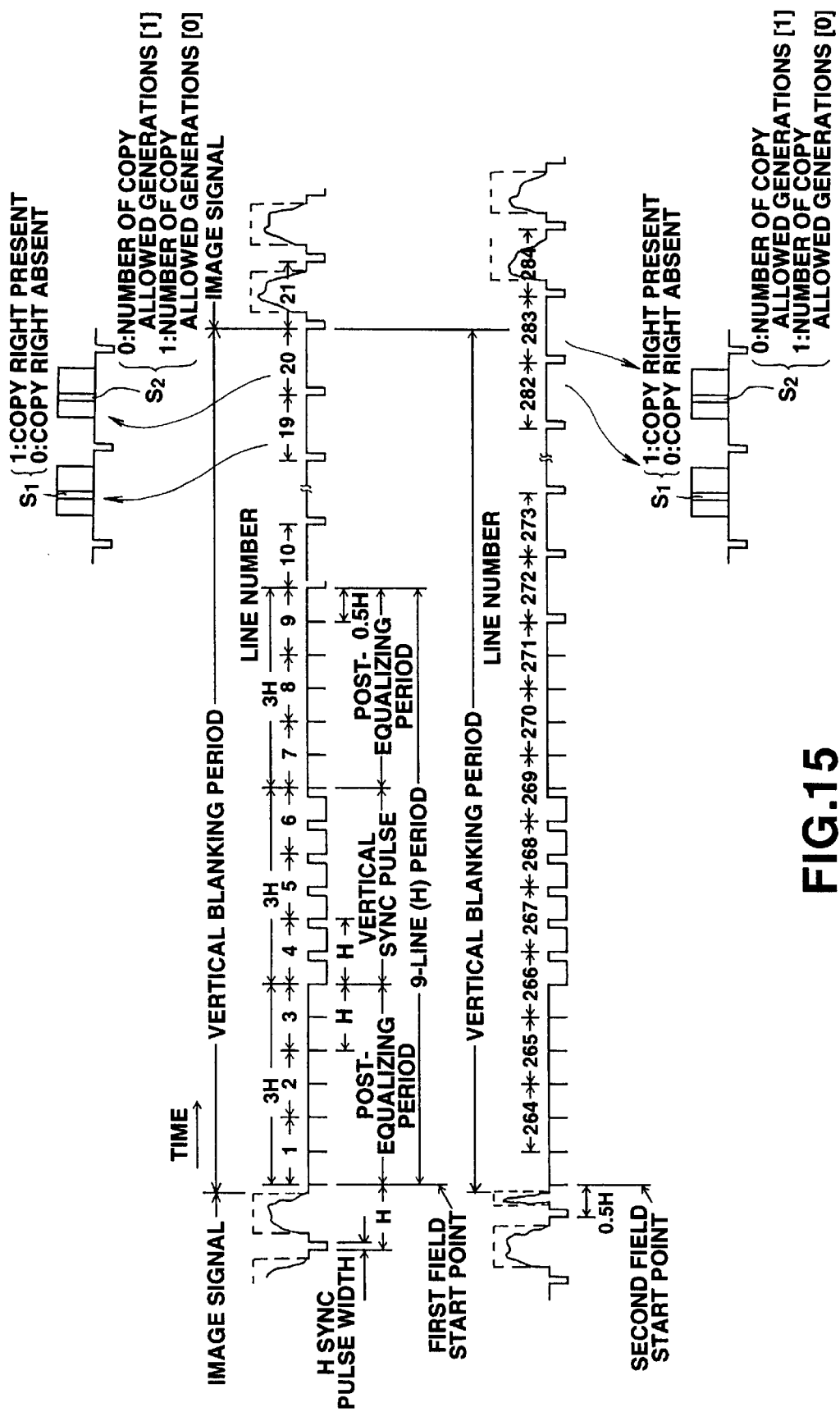
FIG. 15 is a waveform diagram of two fields of a video signal in which the copyright information and copy generation signals are included in VBID data disposed in two line intervals of each field.
Figure 16:
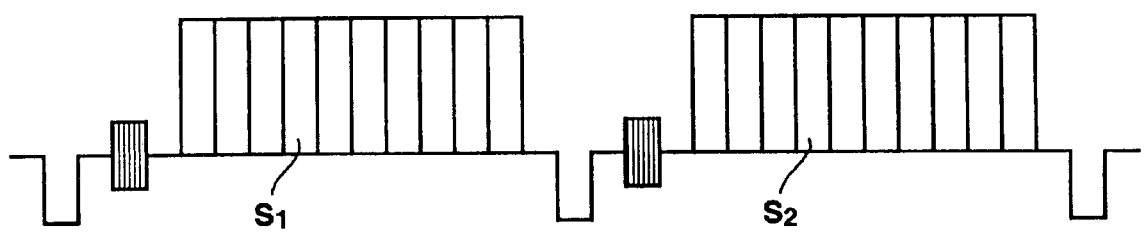
FIG. 16 is a waveform diagram showing in greater detail the VBID data in the two line intervals and including the copyright information and copy generation signals.

FIGS. 15 and 16 represent an embodiment similar to that shown in FIGS. 13 and 14, except that in FIGS. 15 and 16 copyright information signal $S_1$ and copy generation signal $S_2$ are included in the VBID data. In the illustrated embodiment, the VBID data which includes copy information signal $S_1$ is superposed in line 19 of the first field and in line 282 of the second field; and the VBID data containing copy generation signal $S_2$ is superposed in line 20 of the first field and in line 283 of the second field. It is appreciated that in the embodiments of FIGS. 13–14 and FIGS. 15–16, each field of each frame contains both copyright information signal $S_1$ and copy generation signal $S_2$.

Figure 17:
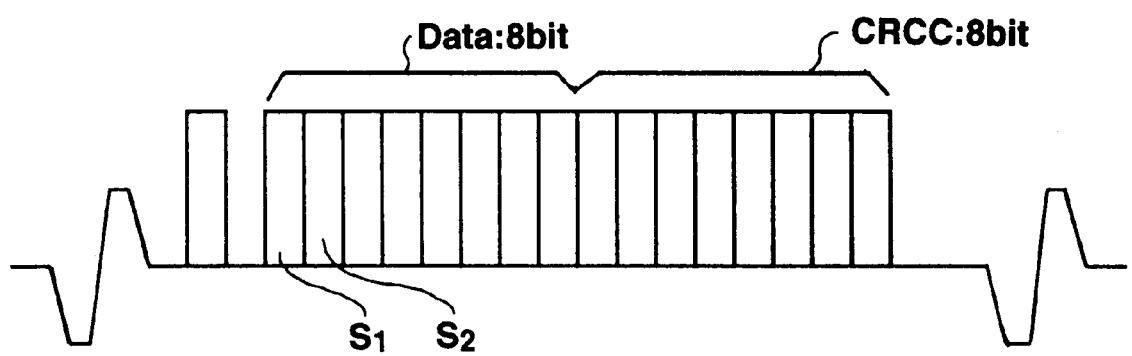
FIG. 17 is a waveform diagram of VBID data that may be used in high definition television signals and which includes the copyright information and copy generation signals.

In the examples discussed above, the copyright information and copy generation signals are superposed in specific lines of the respective fields of the video signal. In particular, lines 19 and 20 of the first field and lines 282 and 283 of the second field are representative of those lines in which these signals are superposed. It will be appreciated, however, that the copyright information and copy generation signals may be superposed in any desired lines in that portion of the video signal which does not contain useful picture information. Moreover, the superposition of the copyright information and copy generation signals in the so-called non-picture portion of the video signal is applicable to various different types of broadcast standards. For example, the copyright information and copy generation signals may be superposed in the non-picture portion of an NTSC signal, a PAL signal or a high definition (HD) signal. In the latter, the copyright information and copy generation signals may be superposed in the thirty-second line interval of each field of an HD frame, such as line 32 of the first field and line 595 of the second field. FIG. 17 schematically illustrates VBID data which contain the copyright information and copy generation signals $S_1$ and $S_2$ that may be superposed in the thirty-second line interval of each HD field.

The examples discussed above have described the copyright information and copy generation signals as respective single bit signals. The following table summarizes the conditions, or states, of these signals and indicates whether the video signal in which such copyright information and copy generation signals are superposed may be recorded, or dubbed. It will be appreciated that the expression "copy permitted" indicates that at least one generation of the video signal may be recorded; and the expression "copy inhibited" indicates that no generations of the video signal may be recorded:

TABLE 1

| Copyright Info. $S_1$ | Copy Generation $S_2$ | Recordable Generations |
| --- | --- | --- |
| 0 | 0 | Copy Permitted |
| 0 | 1 | Copy Permitted |
| 1 | 0 | Copy Permitted |
| 1 | 1 | Copy Inhibited |

In the foregoing Table, $S_1=1$ indicates that the video picture that may be displayed from the video signal is subject to copyright and $S_1=0$ indicates that the video picture is not subject to copyright. In addition, $S_2=0$ indicates that at least one generation of the video signal may be recorded; and $S_2=1$ indicates that no generations of the video signal may be recorded. Hence, a video signal on which is superposed copyright information and copy generation signals $S_1=1$ and $S_2=1$ is inhibited from being recorded.

Figure 18:
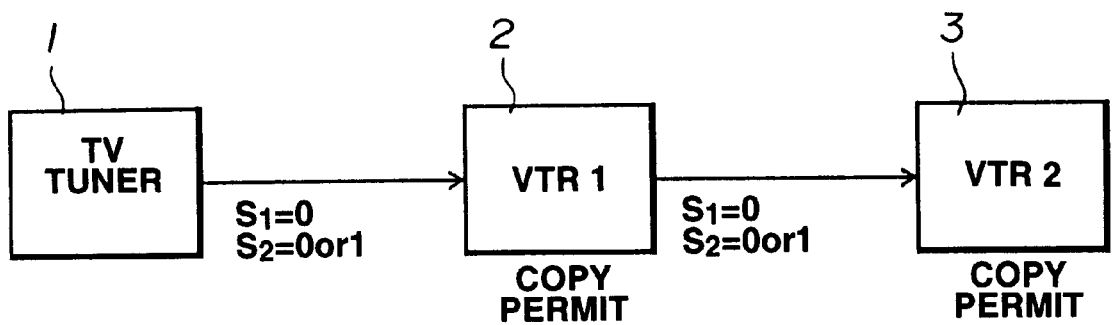
FIGS. 18–20 are block diagrams which are useful in understanding the manner in which the present invention effects copy protection.
Figure 19:
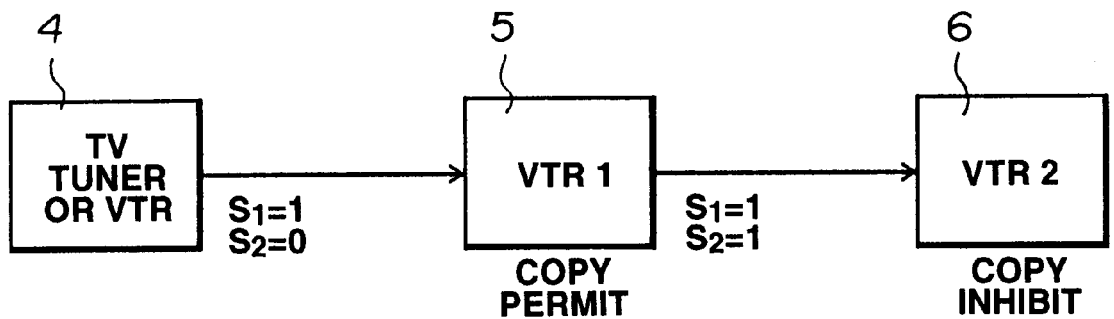
Figure 20:
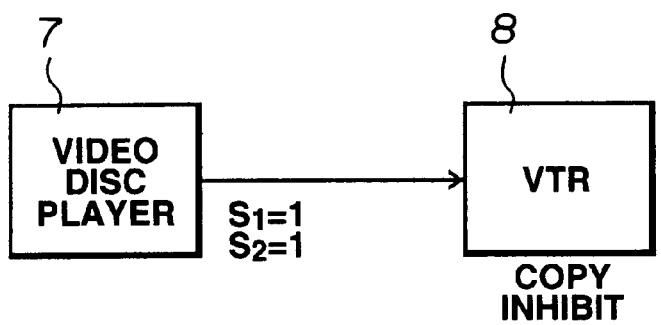

Three typical examples of serial copy management that may be achieved by the single bit copyright information and copy generation signals are represented by the block diagrams of FIGS. 18–20. In FIG. 18, it is assumed that a video signal on which the copyright information and copy generation signals $S_1$ and $S_2$ are superposed is received by a television tuner 1. It will be appreciated that this video signal may be broadcasted or may be supplied as video signals reproduced from a video disk or from a video tape. In any event, in the example represented by FIG. 18, it is assumed that the video signal is not subject to copyright and, therefore, $S_1=0$. Consequently, and with reference to copy protection, it is of no moment if copy generation signal $S_2=0$ or $S_2=1$. That is, the video signal which is supplied by tuner 1 to, for example, a video recorder 2 may be recorded by the video recorder. As represented, the superposed copyright information and copy generation signals which are recorded with the video signal by video recorder 2 admit of their same states as are present in the video signal supplied to the video recorder. Hence, the copyright information and copy generation signals $S_1$ and $S_2$ which are superposed on the video signal recorded by video recorder 2 and which subsequently are reproduced by the video recorder are represented as $S_1=0$ and $S_2=0$ or 1.

When the video signal having the superposed copyright information and copy generation signals is reproduced from video recorder 2 and supplied for re-recording by video recorder 3, this re-recording is permitted because the reproduced, superposed copyright information signal $S_1=0$. As before, if $S_1=0$, it does not matter if $S_2=0$ or $S_2=1$. Thus, video recorder 3 is permitted to record the video signal reproduced from video recorder 2 on which the illustrated copyright information and copy generation signals are superposed. Thus, a first generation of the video signal may be recorded by video recorder 2 and a second generation of the video signal may be recorded by video recorder 3. That is, a copy of the original video signal may be made by video recorder 2 and a copy of the copy may be made by video recorder 3. If desired, further generations of copies of the video signal may be made simply by re-recording the video signal reproduced from video recorder 3 and then re-recording that video signal, and so on.

FIG. 19 illustrates the condition that the copyright information signal $S_1$ superposed on the video signal provided by tuner 4 indicates that the viewable picture that may be produced from this video signal is subject to copyright. Hence, $S_1=1$. It is further assumed that the superposed copy generation signal $S_2$ indicates that one generation of the video signal may be recorded. Hence, $S_2=0$. As before, the video signal which is supplied to and recovered by tuner 4 may be broadcast thereto or may be supplied from a video disk or a video tape.

In accordance with one feature of the present invention, to be described below, recording circuitry is included in video recorder 5 to detect the state, or condition, of the superposed copyright information signal $S_1$, and if $S_1=1$, the number of generations of copies that are indicated by copy generation signal $S_2$ is decremented. In the present case, since the copy generation signal is a single bit signal and, thus, may indicate 1 or 0 successive generations of copies that can be made from the video signal, the circuitry included in the video recorder is adapted to change over the copy generation signal from $S_2=0$ to $S_2=1$. Nevertheless, since the superposed copy generation signal supplied to video recorder 5 is $S_2=0$, the video recorder is permitted to record the video signal having the superposed copyright information and copy generation signals. But, in this embodiment, the superposed copy generation signal $S_2$ which is recorded with the video signal by video recorder 5 is changed over to $S_2=1$.

Consequently, when the video signal that had been recorded by video recorder 5 is reproduced, the superposed copy generation signal is $S_2=1$; and since the superposed copyright information signal $S_1=1$, the reproduced video signal is inhibited from being re-recorded. Accordingly, if the video signal reproduced from video recorder 5 is supplied to another video recorder, such as video recorder 6 having copy protection circuitry incorporated therein (such as that shown in FIG. 21), $S_1=1$ and $S_2=1$ inhibits video recorder 6 from recording this video signal. It will be seen, therefore, that when the video signal that is supplied to video recorder 5 includes superposed copyright information and copy generation signals $S_1=1$ and $S_2=0$, only one generation of the video signal may be recorded and a successive generation may not. Thus, and as has been described above, video recorder 5 is enabled to record one generation of the video signal but a further generation from the video signal recorded by video recorder 5 cannot be made. That is, the copy made by video recorder 5 cannot be re-copied. Stated otherwise, only one generation of a dubbed video signal may be obtained.

As another example, FIG. 20 schematically illustrates the reproduction of a video signal from, for example, a video disk player 7, wherein the reproduced video signal has superposed thereon copyright information and copy generation signals $S_1=1$ and $S_2=1$. If this video signal is supplied to a recorder, such as video recorder 8, having the copy protection circuitry of the present invention, the video recorder is inhibited from recording this video signal. That is, since the superposed copyright information and copy generation signals indicate that no generations of the video signal may be made, even a single generation, or copy, of the video signal is inhibited. Of course, the video signal which is reproduced by video disk player 7 may, nevertheless, be displayed as an acceptable video picture.

It will be appreciated that although a video disk player is illustrated in FIG. 20, the superposed copyright information and copy generation signals $S_1=1$ and $S_2=1$ may be included in a video signal that is recorded on a video tape or that is broadcast over-the-air, by cable distribution, by direct satellite broadcast, or the like. Nevertheless, if $S_1=1$ and $S_2=1$, the video signal upon which these copyright information and copy generation signals are superposed cannot be recorded.

Figure 21:
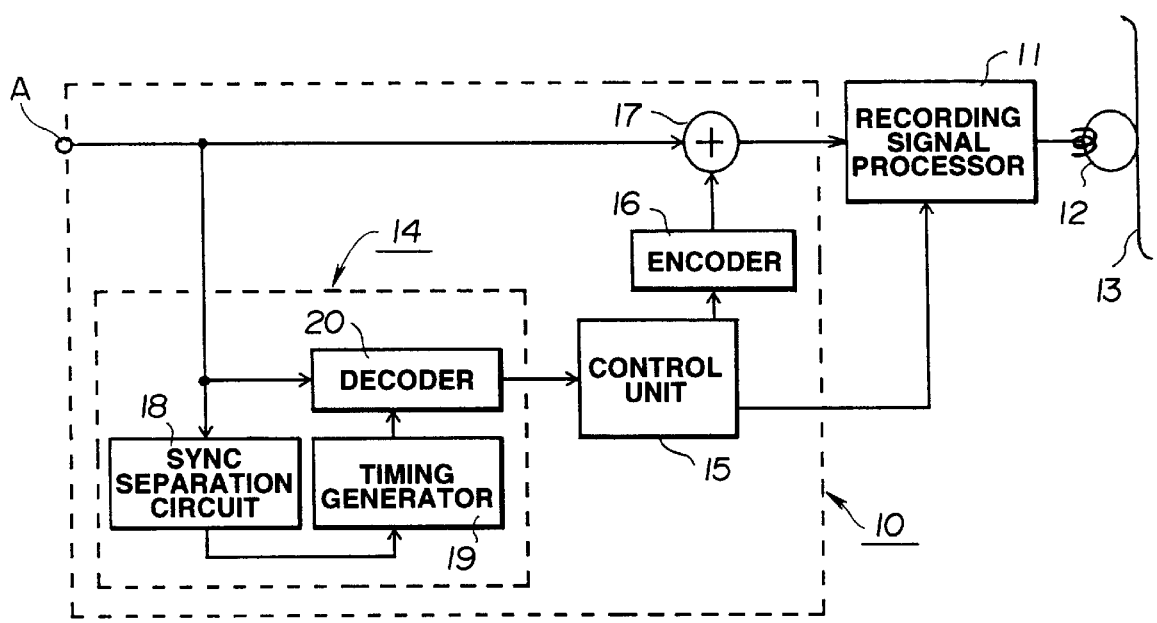
FIG. 21 is a block diagram of circuitry in accordance with the present invention which may be included in the recording channel of a video recorder.

Turning now to FIG. 21, circuitry in accordance with the present invention and which may be included in the recording channel of a video recorder is illustrated in block diagram form. As will be described, this circuitry is adapted to superpose onto the non-picture portion of a video signal the aforementioned copyright information and copy generation signals; and, moreover, is adapted to detect the presence of such signals which may be superposed on a received video signal so as to selectively control the recording operation of the video recorder. The illustrated circuitry is comprised of a superposition unit 10 which includes a copy protection detector 14, and also is comprised of a controllable recording signal processor 11. Let it be assumed that a video signal supplied to an input terminal A of the circuitry illustrated in FIG. 21 includes the aforementioned copyright information and copy generation signals $S_1$ and $S_2$ in the non-picture portion of the video signal. In the examples discussed above, $S_1$ may be superposed in the twentieth line interval of the first field of a video frame and $S_2$ may be superposed in the twentieth line interval of the second field. Alternatively, both $S_1$ and $S_2$ may be superposed in the twentieth line interval of each field; and as yet another alternative, $S_1$ and $S_2$ may be superposed in the nineteenth and twentieth line intervals of each field. Of course, and depending upon the format of the video signal (e.g. NTSC, PAL, HD, etc.), the particular line intervals in which $S_1$ and $S_2$ are superposed may vary. Nevertheless, such line intervals are predetermined and the presence therein of the copyright information and/or copy generation signals may be readily detected by copy protection detector 14.

The copy protection detector includes a synchronizing signal separator 18, a timing generator 19 and a decoder 20. synchronizing signal separator 18 and decoder 20 are connected in common to input terminal A to receive the video signal supplied to the input terminal. The synchronizing signal separator is adapted to separate the vertical and horizontal synchronizing pulses from the received video signal; and these separated sync pulses are used to trigger timing generator 19. As an example, the timing generator is adapted to be preset to a predetermined count in response to the separated vertical sync pulses, which count is incremented in response to each separated horizontal sync pulse. In this manner, timing generator 19 functions to count the line intervals in each field. When the line interval(s) in which the copyright information and copy generation signals are superposed are reached, the timing generator supplies an enable signal to decoder 20 whereupon the copyright information and copy generation signals then present are decoded. It will be appreciated that the copyright information and copy generation signals $S_1$ and $S_2$ are decoded by the decoder even if $S_1$ and $S_2$ are included in VBID data, discussed above.

A control unit 15 is coupled to the output of copy protection detector 14, namely the output of decoder 20, and, depending upon the decoded copyright information and copy generation signals $S_1$ and $S_2$, the control unit selectively controls the operation of recording signal processor 11 and, moreover, supplies updated copyright information and copy generation signals to an encoder 16 for superposition in the non-picture portion of the video signal supplied by input terminal A. Encoder 16 is adapted to generate the proper signal waveform of the copyright information and copy generation signals, these signals being supplied to a mixer 17 for superposition on the video signal. For example, the encoder is adapted to generate copyright information signal $S_1$ and copy generation signal $S_2$ having the signal waveforms shown in FIGS. 2 and 3, or shown in FIGS. 5 and 6, or shown in FIG. 8, or shown in FIG. 10, or shown in FIGS. 11–12, or shown in FIG. 14 or shown in FIGS. 16 and 17 discussed above.

Recording signal processor 11 may be conventional; and in accordance with the present invention, the operation of the recording signal processor may be inhibited by control unit 15 if $S_1=1$ and $S_2=1$, as discussed above. Assuming that the recording signal processor is not inhibited, it supplies to a recording head 12 a suitably modulated video signal having superposed in the non-picture portion thereof the copyright information and copy generation signals produced by encoder 16 for recording on magnetic medium 13. In the present example, magnetic medium 13 comprises a magnetic tape; although it will be appreciated that the magnetic medium may adopt other forms, such as a magnetic disk.

Control unit 15 may be constructed as a central processing unit (CPU), such as a microprocessor, or the like. The manner in which the control unit operates now will be described in conjunction with the flow chart illustrated in FIG. 22.

It is assumed that timing generator 19 generates a suitable gating or window pulse to enable decoder 20 to decode copyright information signal $S_1$ and copy generation signal $S_2$ which are superposed in the predetermined line interval (s) of the non-picture portion of the received video signal discussed above. It is further assumed that control unit 15 is supplied with suitable indications of the levels, or bit values, of $S_1$ and $S_2$. Initially, the routine executed by control unit 15 inquires, at 101, if the copyright information signal $S_1$ is 0 or 1. If inquiry 101 indicates that $S_1=0$, that is, the viewable picture which may be displayed from the received video signal is not subject to copyright, the routine advances to instruction 102 to control encoder 16 to supply to mixer 17 the copyright information signal $S_1=0$ and the copy generation signal $S_2=0$ or 1, depending upon the state of $S_2$ as decoded by decoder 20. That is, encoder 16 is controlled by control unit 15 to make no changes in the copyright information and copy generation signals as received at input terminal A. The routine then advances to step 103 which permits recording signal processor 11 to record the video signal with the new copyright information and copy generation signals superposed thereon.

If inquiry 101 is answered such that $S_1=1$, the routine advances to inquiry 104 to determine the state of the copy generation signal $S_2$. Assuming that $S_2=1$, thereby indicating that no successive generations of copies can be made from the video signal supplied by input terminal A, control unit 15 inhibits recording signal processor 11 from recording the video signal, as represented by instruction 105. However, if inquiry 104 indicates that $S_2=0$, thus representing that one generation of copies may be made from the input video signal, the routine advances to instruction 106 which modifies the state of the copy generation signal from $S_2=0$ to $S_2=1$. Additionally, the copyright information signal $S_1$ is regenerated as $S_1=1$. Mixer 17 superposes the new copyright information and copy generation signals $S_1=1$ and $S_2=1$ onto the non-picture portion of the video signal supplied by input terminal A, and the resultant, or processed, video signal is recorded on magnetic medium 13, as represented by instruction 107. It will be appreciated, however, that when the video signal having the superposed copy protection information $S_1=1$ and $S_2=1$ subsequently is reproduced from magnetic medium 13, the reproduced video signal, if supplied to circuitry of the type shown in FIG. 21, will not be re-recorded. That is, a second generation of the copy which was made in accordance with instruction 107 is inhibited.

Figure 22:
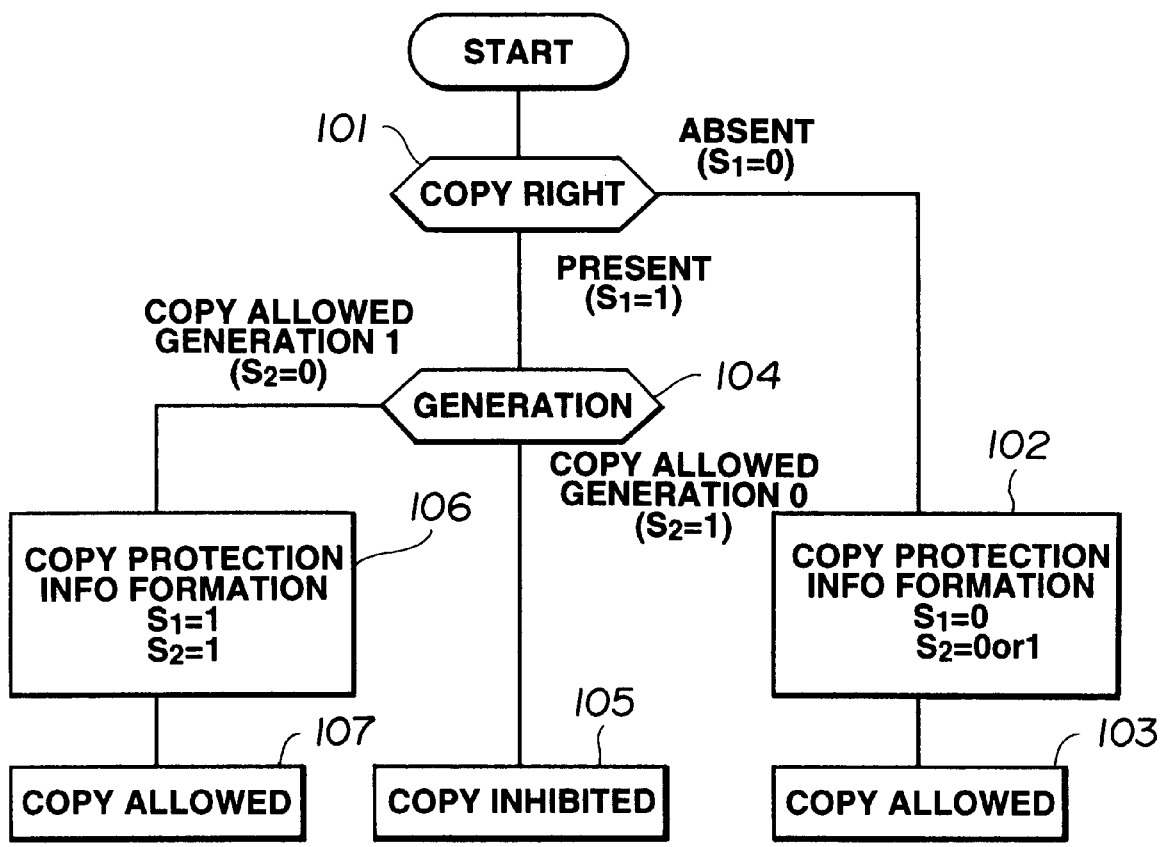
FIG. 22 is a flow chart representing the routine carried out by control unit 15 of FIG. 21.

It will be seen that the flow charts shown in FIG. 22 may be summarized by Table 1, discussed above. It is recognized that if copyright information signal $S_1$ is 1, the copy generation signal $S_2$ is decremented. However, if $S_1=1$ and $S_2=1$, there is no need to decrement the copy generation signal because recording of the video signal (having $S_1$ and $S_2$ superposed thereon) is inhibited.

As another embodiment of the present invention, a video signal recorded on a record medium which includes copy protection information, such as the aforementioned superposed copyright information and copy generation signals $S_1$ and $S_2$, may be reproduced from the record medium and the copy protection information may be re-superposed on the reproduced video signal in the proper, predetermined line intervals. An example of circuitry adapted to carry out this operation is illustrated in the block diagram shown in FIG. 23. The illustrated circuitry comprises a reproducing signal processor 23 and a superposition unit 24, the latter being coupled to the reproducing signal processor and being adapted to superpose onto the non-picture portion of the video signal processed by the reproducing signal processor the copyright information signal $S_1$ and the copy generation signal $S_2$. A video signal reproduced by a head 22 from record medium 21 is assumed to include copy protection information. In one embodiment, the copy protection information consists of the aforementioned copyright information and copy generation signals $S_1$ and $S_2$; and in another embodiment, the copy protection information consists of a predetermined signal, waveform or code intended to indicate whether the viewable picture which may be displayed from the video signal is subject to copyright and also to indicate whether 1 or 0 generations of copies can be made from the reproduced video signal. The reproduced video signal containing this copy protection information is suitably processed by reproducing signal processor 23 (e.g. the video signal is demodulated, equalized, etc.) and supplied to superposition unit 24.

The superposition unit includes a copy protection detector 25, a control unit 26, an encoder 27 and a mixer 28, the latter being adapted to superpose onto the non-picture portion of the reproduced video signal copyright information and copy generation signals $S_1$ and $S_2$ produced by encoder 27. Copy protection detector 25 is coupled to the output of reproducing signal processor 23 and is adapted to detect the aforementioned copy protection information included in the reproduced video signal. It is appreciated that this copy protection information may take the form of signals $S_1$ and $S_2$; or other waveforms or codes may be used, as mentioned above. In the preferred embodiment, the copy protection information is in the form of signals $S_1$ and $S_2$ which admit of the states discussed above and shown in Table 1.

Upon detecting the status of the copyright information and copy generation signals, copy protection detector 25 supplies suitable status indications to control unit 26 which, in turn, controls encoder 27 to supply to mixer 28 updated, or new copyright information and copy generation signals. In one embodiment, the copyright information and copy generation signals which are detected by copy protection detector 25 are regenerated and supplied to mixer 28 to be superposed onto the appropriate line intervals of the video signal, discussed above. In another embodiment, the copy protection information included in the reproduced video signal is other than the signals $S_1$ and $S_2$; and control unit 26 is responsive to the detected copy protection information to control encoder 27 to supply to mixer 28 copyright information and copy generation signals $S_1$ and $S_2$ of appropriate states. For example, if the copy protection information indicates that the viewable picture which may be displayed from the reproduced video signal is not subject to copyright, control unit 26 controls encoder 27 to supply the copyright information signal $S_1=0$. However, if the copy protection information indicates that the viewable picture which may be displayed from the reproduced video signal is subject to copyright information, encoder 27 is controlled to supply to mixer 28 the copyright information signal $S_2=1$. Similarly, if the copy protection information included in the reproduced video signal indicates that the video signal is not to be copied, control unit 26 controls encoder 27 to supply to mixer 28 the copy generation signal $S_2=1$.

As a result, mixer 28 supplies to an output terminal the reproduced video signal on which the copyright information and copy generation signals $S_1$ and $S_2$ are superposed in the non-picture portion thereof.

Figure 24:
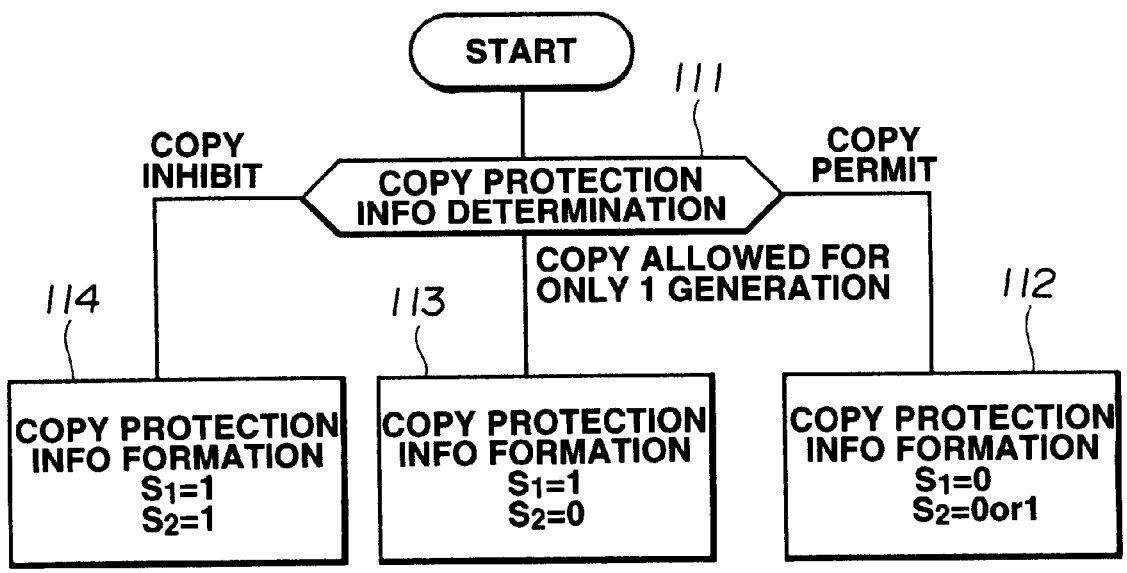
FIG. 24 is a flow chart of the routine carried out by control unit 26 of FIG. 23.

Control unit 26 may be in the form of a central processor unit (CPU) such as a microprocessor programmed to operate in accordance with the routine illustrated by the flow chart of FIG. 24. This routine operates as follows:

Initially, inquiry is made as to whether the copy protection information detected by copy protection detector 25 indicates (a) that the reproduced video signal may be copied without limitation, or (b) that the reproduced video signal may be recorded to provide but a single generation of copies, or (c) that the video signal may not be copied. This inquiry is determined by examining the copyright information and copy generation signals $S_1$ and $S_2$. Let it be assumed that $S_1=0$, meaning that the reproduced video signal may be copied without limitation. As a result, control unit 26 advances to instruction 112 so as to control encoder 27 to supply to mixer 28 the signals $S_1=0$ and $S_2=0$ or 1, depending upon whether the copy generation signal $S_2$ that had been superposed in the video signal recorded on medium 21 is a 0 or 1. As a result of instruction 112, the video signal supplied to the output terminal shown in FIG. 23 has superposed on the non-picture portion thereof the copyright information and copy generation signals $S_1=0$ and $S_2=0$ or 1.

As another example, let it be assumed that the copy protection information included in the reproduced video signal indicates that only one generation of copies may be made from that video signal. As a result, inquiry 111 indicates that $S_1=1$ and $S_2=0$. That is, control unit 26 indicates that the viewable picture which may be displayed from the reproduced video signal is subject to copyright ($S_1=1$) and only one generation of copies may be made therefrom ($S_2=0$). As a result, the routine advances to instruction 113, whereby encoder 27 is controlled to supply to mixer 28 the copyright information and copy generation signals $S_1=1$ and $S_2=0$. These copyright information and copy generation signals are superposed onto the non-picture portion of the reproduced video signal; and the superposed video signal is supplied to the output terminal from mixer 28.

As yet another example, let it be assumed that the copy protection information included in the video signal reproduced from medium 21 indicates that the video signal cannot be copied. For example, let it be assumed that the reproduced video signal contains superposed copyright information and copy generation signals $S_1=1$ and $S_2=1$. Hence, inquiry 111 is answered such that the routine advances to instruction 114, whereby encoder 27 is controlled to supply to mixer 28 the copyright information and copy protection signals $S_1=1$ and $S_2=1$. These copyright information and copy generation signals are superposed onto the non-picture portion of the reproduced video signal and supplied to the output terminal shown in FIG. 23. It will be appreciated that if this video signal is received by a video recorder which includes the circuitry shown in FIG. 21, the recorder will be inhibited from recording that video signal.

In the examples discussed above, it is assumed that copy generation signal $S_2$ is comprised of a single bit signal. It is further assumed that when $S_2=0$, one generation of copies may be made from the video signal and when $S_2=1$, zero generations of copies may be made. It is contemplated, however, that copy generation signal $S_2$ may be a plural-bit signal capable of representing a count which is indicative of the number of successive generations or copies that can be made from the video signal. For example, if copy generation signal $S_2$ is a 2-bit signal, then up to three generations of copies may be indicated. If $S_2$ is a 3-bit signal, then up to seven generations of copies may be indicated. For convenience, and in order to simplify the following discussion, it is assumed that $S_2$ is a 2-bit signal.

Figure 25:
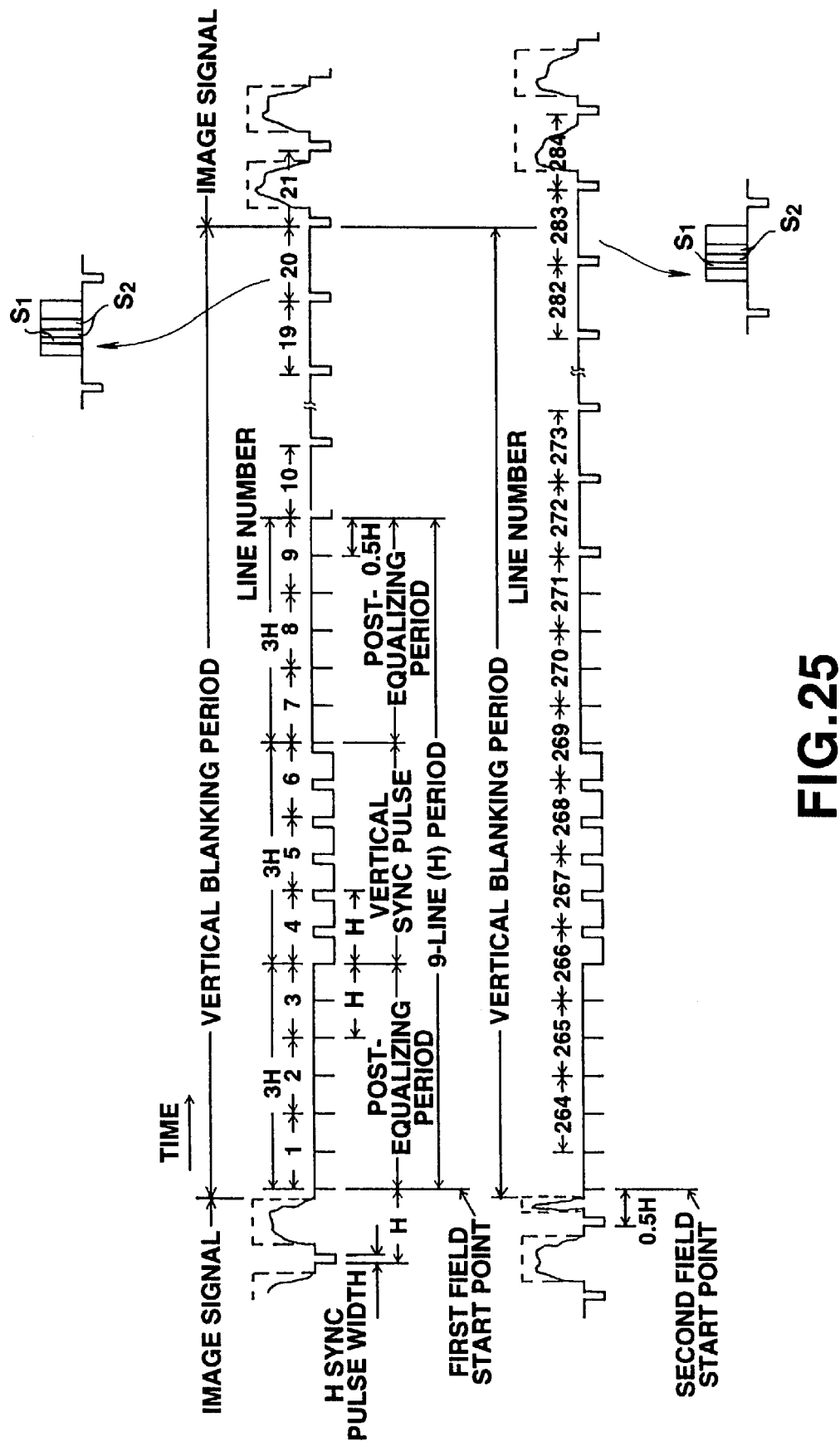
FIG. 25 is a waveform diagram of two fields of a video signal which contain a copyright information signal and a plural bit copy generation signal in accordance with the present invention.
Figure 26:
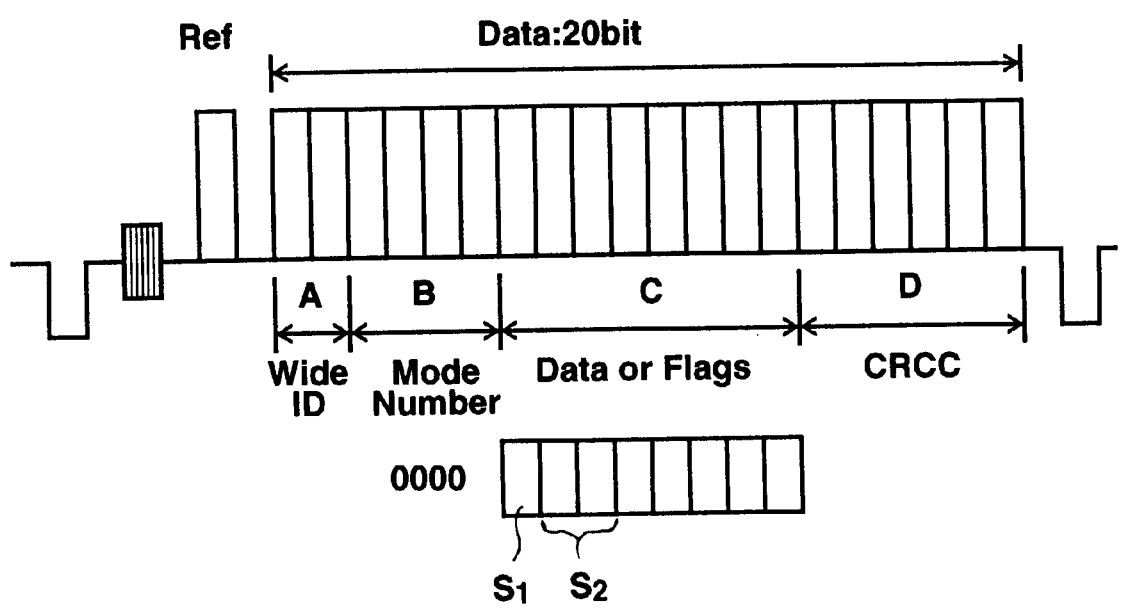
FIG. 26 is a waveform diagram showing in greater detail VBID data containing the copyright information signal and plural but copy generation signal.

As one example, let it be assumed that the copyright information signal $S_1$ is a single bit signal and copy generation signal $S_2$ is a 2-bit signal and that both signals $S_1$ and $S_2$ are superposed in line 20 of each field. For example, in the NTSC format, $S_1$ and $S_2$ are superposed in line 20 of the first field and line 283 of the second field, as illustrated in FIG. 25. Alternatively, if VBID data is included in the non-picture portion of each field, for example, if VBID data is included in the twentieth line interval of each field, then copyright information and copy generation signals $S_1$ and $S_2$ are included in such VBID data, such as illustrated in FIG. 26.

Although a complete and full understanding of the VBID data and the various types of information represented thereby is not necessary to an adequate understanding of the present invention, a brief description of the VBID data now follows. As shown in FIG. 26, the VBID data is comprised of four separate data fields designated A, B, C and D. The A field is comprised of two bits representing identifying data. The B field is comprised of four bits representing a mode number. The C field is comprised of eight bits representing data or data flags. The D field is comprised of six bits representing an error check code such as cyclic redundancy check code.

More particularly, the identifying data (the A field) constitutes discrimination data relating to the picture signal transmission system wherein the first bit represents the aspect ratio of the viewable picture that may be displayed from the video signal (e.g. an aspect ratio of 16:9 or an aspect ratio of 4:3); and the second bit indicates a standard system or a letter box system. The foregoing may be summarized by Table 2 as follows:

TABLE 2

| Bit Number | 1 | 0 | Contents |
|---|---|---|---|
| bit 1 | 16:9 | 4:3 | Transmission Aspect Ratio |
| bit 2 | Letter Box | Standard | Picture Display Format |

The mode number data (the B field) is adapted to classify the data or the flags included in the C field into one of sixteen different types. A summary of these types of data or flags is summarized in Table 3, wherein the expression "TBD" means "to be determined."

TABLE 3

| Mode Number (B) | Contents | Coding (C) |
|---|---|---|
| 0000 | System | Flags (TABLE 4) |
| 0001 | Year | BCD (00~99) |
| 0010 | Month | BCD (01~12) |
| 0011 | Day | BCD (01~31) |
| 0100 | Hour | BCD (00~29) |
| 0101 | Minute | BCD (00~59) |
| 0110 | TBD | |
| 0111 | TBD | |
| 1000 | TBD | |
| 1001 | TBD | |
| 1010 | TBD | |
| 1011 | TBD | |
| 1100 | Text Start | Binary (Text Data Format) |
| 1101 | Text Data | Binary or ASCII |
| 1110 | Text End | Binary (Check Sum) |
| 1111 | TBD | |

In Table 3, mode number [0000] means that the 8-bit data in the C field represents a system flag. Mode number [0001] means that the 8-bit data in the C field represents the year in which the video signal was recorded. The mode number [1100] indicates the start of a letter string of text data; mode number [1101] means that the 8-bit data in the C field represents an alphabetic letter; and mode number [1110] indicates the end of a letter string (e.g. the letter data represented in the 8-bit C field is the last letter in the string). It will be appreciated that alphabetic data thus permits text information, such as the title of the video program, to be included in the video signal itself.

If the mode number represented by the B field is [0000], the system flags represented by the eight bits of the C field may be summarized as follows:

TABLE 4

| Bit Number | Flag Name | 1 | 0 |
|---|---|---|---|
| bit 0 | Copyright Information $S_1$ | Copyright Present | Copyright Absent |
| bit 1 | Copy Generation Information $S_2$ | TABLE 5 | |
| bit 2 | | | |
| bit 3 | 3D Info. | Yes | No |
| bit 4 | TBD | | |
| bit 5 | TBD | | |
| bit 6 | TBD | | |
| bit 7 | Title Info. | Yes | No |

It is seen that bit 0 of the system flags represents copyright information signal $S_1$ and bits 1 and 2 of the system flags represent copy generation signal $S_2$. Bit 3 of the system flags indicates whether the viewable picture which may be displayed from the video signal is a three-dimensional (3-D) picture; and bit 7 of the system flags indicates whether or not the letter box (see Table 2) contains title information. It is appreciated that the representations of bits 4, 5 and 6 of the system flags are to be determined at a future time.

The three-dimensional information represented by bit 3 of the system flags is used to control a 3-D mode in which a picture is recorded with parallax between the odd and even fields, and switching is effected between the odd and even fields by a liquid crystal shutter during picture reproduction for stereoscopic representation. The information represented by bit 7 of the system flags controls the sliding of the title from the black area of the video picture so as to be displayed in another area and to prevent zooming which may result in extinguishing the title if a wide aspect ratio picture is to be displayed and the title is disposed in the black area of the letter box.

Since the copy generation signal $S_2$ is represented by two bits, it is appreciated that up to three successive generations of copies can be made from the video signal in which this copy generation signal is superposed, depending upon the values of the $S_2$ bits. For example, if the copyright information signal $S_1$ is 1, then the number of possible generations of copies that can be made from the video signal are as summarized below in Table 5:

TABLE 5

| Bit 1 | Bit 2 | Number of Possible Copy Generations |
|---|---|---|
| 1 | 1 | 3 Generations |
| 1 | 0 | 2 Generations |
| 0 | 1 | 1 Generation |
| 0 | 0 | None |

Table 6 provides a summary of the copy control which may be effected by the single bit copyright information signal $S_1$ and the 2-bit copy generation signal $S_2$:

TABLE 6

| Copyright Info. $S_1$ | Copy Generation Info. $S_2$ | Copy Generation Limit |
|---|---|---|
| 0 | 00 | No Limitation |
| 0 | 01 | No Limitation |
| 0 | 10 | No Limitation |
| 0 | 11 | No Limitation |
| 1 | 00 | Inhibited |
| 1 | 01 | 1 Generation Permitted |
| 1 | 10 | 2 Generations Permitted |
| 1 | 11 | 3 Generations Permitted |

Copy control as a function of the copyright information and copy generation signals $S_1$ and $S_2$ summarized in Table 6 are schematically depicted by the block diagrams shown in FIGS. 27–31. As is apparent from FIG. 27, if a source 30 of video signals (e.g. a video disk, a prerecorded video tape, a broadcast transmission, or the like) has superposed in the non-picture portion of the video signal the copyright information and copy generation signals $S_1=0$ and $S_2=0$, then this video signal may be recorded by a video recorder 31 without any change or modification in the copy generation signal $S_2$. Moreover, the video signal recorded by video recorder 31 subsequently may be reproduced and re-recorded as a second generation copy by a video recorder 32. Here too, the superposed copyright information and copy generation signals remain as $S_1=0$ and $S_2=00$. It will be appreciated that successive generations of copies of the video signal recorded by video recorder 32 may be made, for example, a third generation may be recorded by recorder 33, still without any change or modification in the copyright information and copy generation signals.

Figure 27:
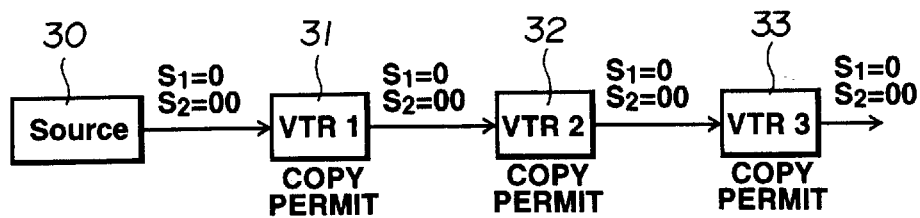
FIGS. 27–31 are block diagrams which are useful in understanding the manner in which copying is selectively controlled in accordance with the present invention.
Figure 28:
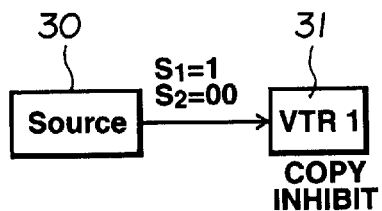

It will be appreciated that FIG. 27 is applicable regardless of the number of successive generations of copies that is represented by the copy generation signal $S_2$.

Now, let it be assumed that the video signal which is supplied by source 30 includes a superposed copyright information signal $S_1=1$, which indicates that the viewable picture which may be displayed from the video signal is subject to copyright, and the copy generation signal $S_2=00$, which indicates that no generations of copies can be made from this video signal. This information is detected by a control unit included in video recorder 31 (e.g. control unit 15 of FIG. 21) which is inhibited by $S_1$ and $S_2$ from recording the video signal.

Figure 29:
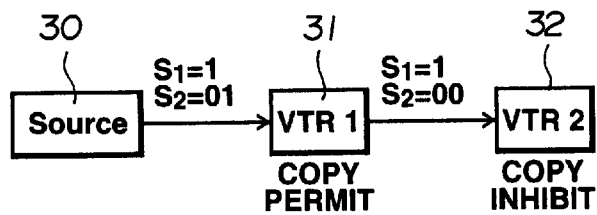

As another example, if the superposed copyright information and copy generation signals included in the video signal supplied by source 30 are $S_1=1$ and $S_2=01$, only one generation of copies may be made. Hence, the control unit included in recorder 31 detects $S_1$ and $S_2$ and permits the video signal to be recorded. However, the control unit superposes a new, or modified, copy generation signal $S_2=00$ in the non-picture portion of the video signal which is recorded by recorder 31. As a result, when the video signal having the modified copy generation signal superposed thereon is reproduced, this reproduced video signal cannot be re-recorded by, for example, recorder 32. Hence, only one copy of the video signal supplied by source 30 may be recorded, as represented by FIG. 29.

Figure 30:
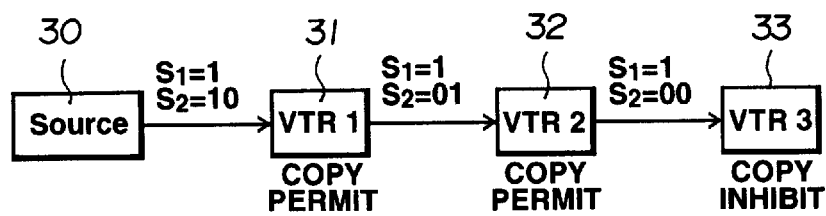

Turning to FIG. 30, let it be assumed that the superposed copyright information and copy generation signals supplied by source 30 are $S_1=1$ and $S_2=10$. This represents that two generations of the video signal may be recorded. It is appreciated that the control unit included in video recorder 31 modifies the copy generation signal from $S_2=10$ to $S_2=01$; and the video signal with the modified copy generation signal is recorded by video recorder 31. As shown in FIG. 30, the copyright information signal $S_1=1$ likewise is recorded by recorder 31. Now, when the video signal which had been recorded by recorder 31 is reproduced and supplied to video recorder 32 for re-recording, the count represented by copy generation signal $S_2=01$ is decremented by the control unit included in recorder 32 to the count $S_2=00$; and this decremented count, together with the copyright information signal $S=1$, is superposed on the video signal played back from video recorder 31 and recorded by video recorder 32. However, when the video signal recorded by recorder 32 is reproduced, it cannot be re-recorded by, for example, video recorder 33, because $S_1=1$ and $S_2=00$; and this information is detected by the control unit included in video recorder 33 to inhibit that recorder from re-recording the video signal. Consequently, only two generations of the video signal may be recorded by video recorders 31 and 32, respectively, but a third generation is inhibited.

Figure 31:
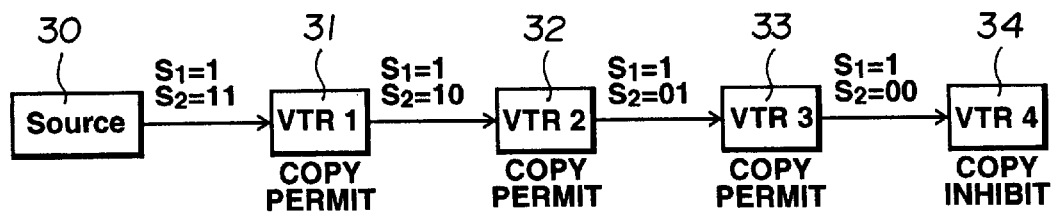

Finally, and as represented by FIG. 31, if the superposed copyright information and copy generation signals included in the video signals supplied by source 30 are assumed to be $S_1=1$ and $S_2=11$, then three generations of successive copies of this video signal may be made. A first generation is recorded by video recorder 31; but the control unit therein modifies the copy generation signal from $S_2=11$ to $S_2=10$. This modified copy generation signal together with the copyright information signal are superposed on the video signal recorded by video recorder 31.

When the video signal that had been recorded by video recorder 31 is reproduced and supplied to video recorder 32 for re-recording, it is appreciated that video recorder 32 modifies the copy generation signal from $S_2=10$ to $S_2=01$. This modified copy generation signal together with the copyright information signal $S_1=1$ are superposed on the video signal reproduced by video recorder 31 and recorded by video recorder 32.

Similarly, when the video signal which had been recorded by video recorder 32 is reproduced to be re-recorded by recorder 33, the control unit included in recorder 33 modifies the copy generation signal from $S_2=01$ to $S_2=00$. The modified copy generation signal and copyright information signal $S_1=1$ are recorded by video recorder 33.

Now, however, when the video signal which had been recorded by recorder 33 is reproduced to be re-recorded by recorder 34, the status of $S_1$ and $S_2$ is detected by the control unit included in video recorder 34; and since $S_1=1$ and $S_2=00$, video recorder 34 is inhibited from re-recording the video signal that had been recorded by video recorder 33. As a consequence, only three generations of the video signal provided by source 30 may be recorded, namely the first generation by recorder 31, the second generation by recorder 32 and the third generation by recorder 33. No further generations of copies may be made.

Figure 23:
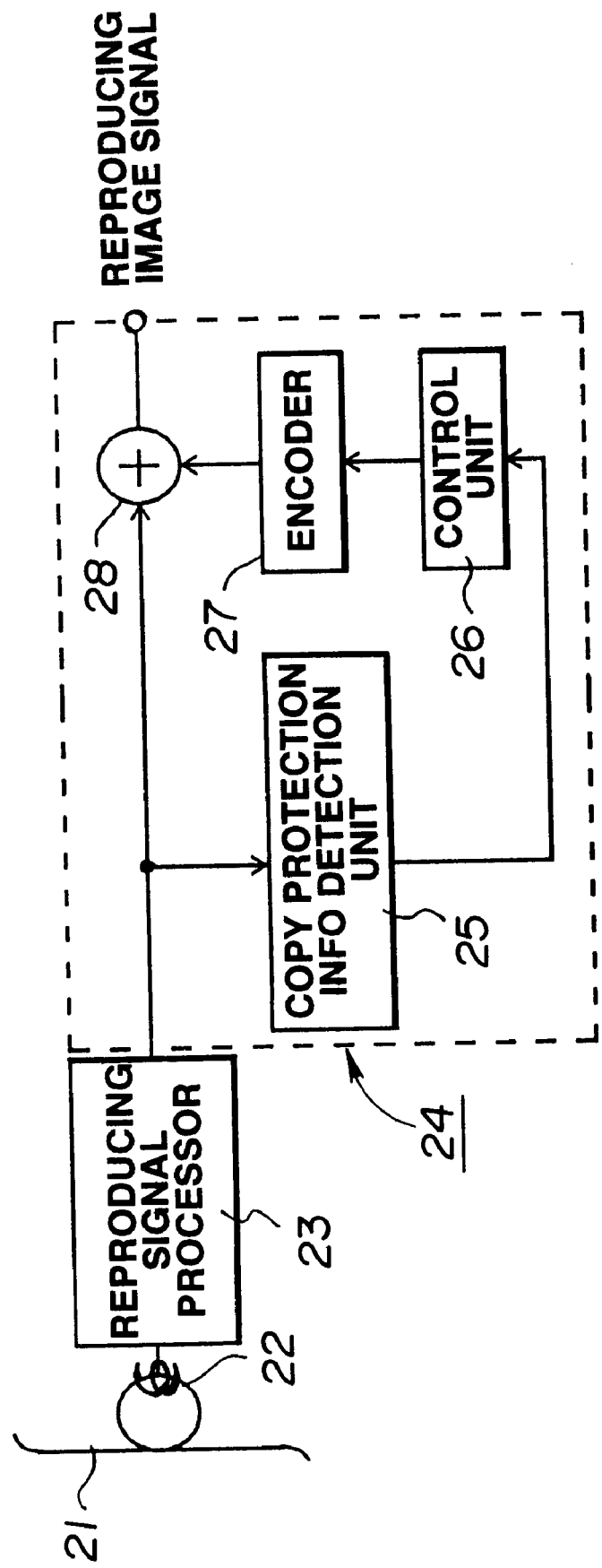
FIG. 23 is a block diagram of circuitry in accordance with the present invention which may be provided in a video signal reproducing channel.

It will be appreciated that in the block diagrams shown in FIGS. 27–31, each video recorder includes the circuitry shown in FIG. 21 in the recording channel thereof and also the circuitry shown in FIG. 23 in the reproducing channel thereof. Hence, if the copyright information signal supplied to a video recorder is $S_1=1$, the circuitry included in the recording channel operates to decrement the count represented by the copy generation signal $S_2$. Of course, if $S_2=00$, the count represented thereby is not decremented and, moreover, the video recorder is inhibited from recording the video signal.

While the present invention has been particularly shown and described with reference to preferred embodiments, it will be readily appreciated that various modifications may be made without departing from the spirit and scope of the invention. For example, it may be preferable to omit the copyright information signal $S_1$ and simply control the number of successive generations of copies that can be made from the video signal as a function of the copy generation signal $S_2$.

It is intended that the appended claims be interpreted so as to cover the embodiments which have been discussed above, all variations and modifications which have been described or suggested, and all equivalents thereto.

What is claimed is:

1. A method of processing a video signal to selectively permit copying thereof, said video signal having an effective picture portion containing useful picture information from which a viewable picture is displayed and a non-picture portion in which is disposed vertical blanking identifying (VBID) data comprised of a plural-bit mode number and associated plural-bit data or data flags wherein said plural-bit mode number selectively classifies said associated plural-bit data or data flags as data or flags such that predetermined bits of said associated plural-bit data or data flags represent different information as a function of the classification by said plural-bit mode number, said method comprising the steps of generating copyright information data indicative of whether the viewable picture is subject to copyright; generating copy generation data indicative of the number of successive generations of copies that can be made from the processed video signal; and setting said predetermined bits as the copyright information data and the copy generation data when said plural-bit mode number classifies said associated plural-bit data or data flags as flags, thereby to produce said processed video signal.

2. The method of claim 1 wherein said video signal contains line intervals and said copyright information data and said copy generation data are superposed in VBID data in respectively different line intervals.

3. The method of claim 2 wherein said video signal contains frame intervals, each formed of field intervals, and said different line intervals are in the same field interval.

4. The method of claim 2 wherein said video signal contains frame intervals, each formed of field intervals, and said different line intervals are in different field intervals of the same frame interval.

5. The method of claim 1 wherein said video signal contains line intervals and said copyright information data and said copy generation data are superposed in VBID data in the same line interval.

6. The method of claim 1 wherein said copy generation signal is a plural bit signal.

7. A video signal record medium having recorded thereon a video signal comprised of an effective picture portion containing useful picture information from which a viewable picture is displayed and a non-picture portion in which is disposed vertical blanking identifying (VBID) data comprised of a plural-bit mode number and associated plural-bit data or data flags, wherein said plural-bit mode number selectively classifies said associated plural-bit data or data flags as data or flags such that when said plural-bit mode number classifies said associated plural-bit data or data flags as flags, predetermined bits of the associated plural-bit data flags represent copyright information and copy generation information, and when said plural-bit mode number classifies said associated plural-bit data or data flags as data, said predetermined bits represent other information; copyright information data indicative of whether the viewable picture is subject to copyright; and copy generation information indicative of the number of successive generations of copies that can be made from the recorded video signal, said copyright information and copy generation information being said predetermined bits in said non-picture portion.

8. The record medium of claim 7 wherein said video signal contains line intervals and said copyright information and said copy generation information are superposed in VBID data in respectively different line intervals.

9. The record medium of claim 8 wherein said video signal contains frame intervals, each formed of field intervals, and said different line intervals are in the same field interval.

10. The record medium of claim 8 wherein said video signal contains frame intervals, each formed of field intervals, and said different line intervals are in different field intervals of the same frame interval.

11. The record medium of claim 7 wherein said video signal contains line intervals and said copyright information and said copy generation information are superposed in VBID data in the same line interval.

12. The record medium of claim 7 wherein said copy generation signal is a plural bit signal.

13. A method of recording a video signal that may be selectively copied, said video signal having an effective picture portion containing useful picture information from which a viewable picture is displayed and a non-picture portion in which is disposed vertical blanking identifying (VBID) data comprised of a plural-bit mode number and associated plural-bit data or data flags wherein said plural-bit mode number selectively classifies said associated plural-bit data or data flags as data or flags such that predetermined bits of said associated plural-bit data or data flags represent different information as a function of the classification by said plural-bit mode number, said method comprising the steps of generating copyright information data indicative of whether the viewable picture is subject to copyright; generating copy generation data indicative of the number of successive generations of copies that can be made from the video signal; setting said predetermined bits as the copyright information data and the copy generation data when said plural-bit mode number classifies said associated plural-bit data or data flags as flags, thereby to produce a processed video signal; and recording said processed video signal on a record medium.

14. The method of claim 13 wherein said video signal contains line intervals and said copyright information data and said copy generation data are superposed in VBID data in respectively different line intervals.

15. The method of claim 14 wherein said video signal contains frame intervals, each formed of field intervals, and said different line intervals are in the same field interval.

16. The method of claim 14 wherein said video signal contains frame intervals, each formed of field intervals, and said different line intervals are in different field intervals of the same frame interval.

17. The method of claim 13 wherein said video signal contains line intervals and said copyright information data and said copy generation data are superposed in VBID data in the same line interval.

18. The method of claim 13 wherein said copy generation signal is a plural bit signal.

19. A method of selectively recording a video signal having an effective picture portion containing useful picture information from which a viewable picture is displayed and a non-picture portion in which is disposed vertical blanking identifying (VBID) data comprised of a plural-bit mode number and associated plural-bit data or data flags, wherein said plural-bit mode number selectively classifies said associated plural-bit data or data flags as data or flags such that when said plural-bit mode number classifies said associated plural-bit data or data flags as flags, predetermined bits of the associated plural-bit data flags represent copyright information indicative of whether the viewable picture is subject to copyright and copy generation information indicative of the number of successive generations of copies that can be made from the video signal, and when said plural-bit mode number classifies said associated plural-bit data or data flags as data, said predetermined bits represent other information, said method comprising the steps of detecting said copyright information and said copy generation information; modifying the predetermined bits to indicate a decremented number of successive generations of copies that can be made from the video signal if said copyright information indicates that the viewable picture is subject to copyright; recording the video signal having said copyright information and said modified copy generation information in said VBID data; and selectively inhibiting the recording of the video signal when said copyright information indicates that said viewable picture is subject to copyright and the detected copy generation information indicates that no successive generations of copies may be made from the video signal.

20. The method of claim 19 wherein said step of modifying the predetermined bits comprises generating new copy generation information indicative of one less than the number of successive generations of copies which are indicated by the detected copy generation information, and superposing said new copy generation information in said VBID data of the video signal.

21. The method of claim 20 further comprising the steps of regenerating the detected copyright information, and superposing said regenerated copyright information in said VBID data of the video signal.

22. The method of claim 19 wherein said video signal contains line intervals and said copyright information and said copy generation information are superposed in VBID data in respectively different line intervals.

23. The method of claim 22 wherein said video signal contains frame intervals, each formed of field intervals, and said different line intervals are in the same field interval.

24. The method of claim 22 wherein said video signal contains frame intervals, each formed of field intervals, and said different line intervals are in different field intervals of the same frame interval.

25. The method of claim 19 wherein said video signal contains line intervals and said copyright information and said copy generation information are superposed in VBID data in the same line interval.

26. The method of claim 19 wherein said copy generation signal is a plural bit signal.

27. A method of reproducing a video signal having an effective picture portion and a non-picture portion and containing copy protection information representing whether a video picture derived from said video signal is subject to copyright and whether successive generations of copies can be made from said video signal, said method comprising the steps of playing back said video signal from a record medium; detecting said copy protection information in the played back video signal; generating copyright information data indicative of whether said video picture is subject to copyright; generating copy generation data indicative of the number of successive generations of copies that can be made from said played back video signal; setting both said copyright information data and said copy generation data as predetermined bits of plural-bit data flags which are associated with and classified by a plural-bit mode number, said plural-bit data flags and plural-bit mode number being included in vertical blanking identifying (VBID) data, and said predetermined bits being used to represent other information as a function of the classification of said plural-bit data flags by said plural-bit mode number; and disposing said VBID data in the non-picture portion of said played back video signal.

28. The method of claim 27 wherein said video signal contains line intervals and said copyright information data and said copy generation data are superposed in VBID data in respectively different line intervals.

29. The method of claim 28 wherein said video signal contains frame intervals, each formed of field intervals, and said different line intervals are in the same field interval.

30. The method of claim 28 wherein said video signal contains frame intervals, each formed of field intervals, and said different line intervals are in different field intervals of the same frame interval.

31. The method of claim 27 wherein said video signal contains line intervals and said copyright information data and said copy generation data are superposed in VBID data in the same line interval.

32. The method of claim 27 wherein said copy generation signal is a plural bit signal.

33. The method of claim 27 wherein said copy protection information comprises recorded copyright information data and recorded copy generation data, both included in VBID data in the non-picture portion of the video signal on said record medium, and both being detected to cause the detected copyright information data and copy generation data to be set as said predetermined bits in the VBID data of said played back video signal.

34. Apparatus for processing a video signal to selectively permit copying thereof, said video signal having an effective picture portion containing useful picture information from which a viewable picture is displayed and a non-picture portion in which is disposed vertical blanking identifying (VBID) data comprised of a plural-bit mode number and associated plural-bit data or data flags wherein said plural-bit mode number selectively classifies said associated plural-bit data or data flags as data or flags such that predetermined bits of said associated plural-bit data or data flags represent different information as a function of the classification by said plural-bit mode number, said apparatus comprising means for generating copyright information data indicative of whether the viewable picture is subject to copyright; means for generating copy generation data indicative of the number of successive generations of copies that can be made from the processed video signal; and means for setting said predetermined bits as the copyright information data and the copy generation data when said plural-bit mode number classifies said associated plural-bit data or data flags as flags, thereby to produce said processed video signal.

35. The apparatus of claim 34 wherein said video signal contains line intervals and said copyright information data and said copy generation data are superposed in VBID data in respectively different line intervals.

36. The apparatus of claim 35 wherein said video signal contains frame intervals, each formed of field intervals, and said different line intervals are in the same field interval.

37. The apparatus of claim 35 wherein said video signal contains frame intervals, each formed of field intervals, and said different line intervals are in different field intervals of the same frame interval.

38. The apparatus of claim 34 wherein said video signal contains line intervals and said copyright information data and said copy generation data are superposed in VBID data in the same line interval.

39. The apparatus of claim 34 wherein said copy generation signal is a plural bit signal.

40. Apparatus for recording a video signal that may be selectively copied, said video signal having an effective picture portion containing useful picture information from which a viewable picture is displayed and a non-picture portion in which is disposed vertical blanking identifying (VBID) data comprised of a plural-bit mode number and associated plural-bit data or data flags wherein said plural-bit mode number selectively classifies said associated plural-bit data or data flags as data or flags such that predetermined bits of said associated plural-bit data or data flags represent different information as a function of the classification by said plural-bit mode number, said apparatus comprising means for generating copyright information data indicative of whether the viewable picture is subject to copyright; means for generating copy generation data indicative of the number of successive generations of copies that can be made from the video signal; means for setting said predetermined bits as the copyright information data and the copy generation data when said plural-bit mode number classifies said associated plural-bit data or data flags as flags, thereby to produce a processed video signal; and means for recording said processed video signal on a record medium.

41. The apparatus of claim 40 wherein said video signal contains line intervals and said copyright information data and said copy generation data are superposed in VBID data in respectively different line intervals.

42. The apparatus of claim 41 wherein said video signal contains frame intervals, each formed of field intervals, and said different line intervals are in the same field interval.

43. The apparatus of claim 41 wherein said video signal contains frame intervals, each formed of field intervals, and said different line intervals are in different field intervals of the same frame interval.

44. The apparatus of claim 40 wherein said video signal contains line intervals and said copyright information data and said copy generation data are superposed in VBID data in the same line interval.

45. The apparatus of claim 40 wherein said copy generation signal is a plural bit signal.

46. Apparatus for selectively recording a video signal having an effective picture portion containing useful picture information from which a viewable picture is displayed and a non-picture portion in which is disposed vertical blanking identifying (VBID) data comprised of a plural-bit mode number and associated plural-bit data or data flags, wherein said plural-bit mode number selectively classifies said associated plural-bit data or data flags as data or flags such that when said plural-bit mode number classifies said associated plural-bit data or data flags as flags, predetermined bits of the associated plural-bit data flags represent copyright information indicative of whether the viewable picture is subject to copyright and copy generation information indicative of the number of successive generations of copies that can be made from the video signal, and when said plural-bit mode number classifies said associated plural-bit data or data flags as data, said predetermined bits represent other information, said apparatus comprising means for detecting said copyright information and said copy generation information; means for modifying the predetermined bits to indicate a decremented number of successive generations of copies that can be made from the video signal if said copyright information indicates that the viewable picture is subject to copyright; means for recording the video signal having said copyright information and said modified copy generation information in said VBID data; and means for selectively inhibiting the recording of the video signal when said copyright information indicates that said viewable picture is subject to copyright and the detected copy generation information indicates that no successive generations of copies may be made from the video signal.

47. The apparatus of claim 46 wherein said means for modifying the predetermined bits comprises means for generating new copy generation information indicative of one less than the number of successive generations of copies which are indicated by the detected copy generation information, and means for superposing said new copy generation information in said VBID data of the video signal.

48. The apparatus of claim 47 wherein said means for recording includes means for regenerating the detected copyright information, and means for superposing said regenerated copyright information in said VBID data of the video signal prior to the recording of said video signal.

49. The apparatus of claim 46 wherein said video signal contains line intervals and said copyright information and said copy generation information are superposed in VBID data in respectively different line intervals.

50. The apparatus of claim 49 wherein said video signal contains frame intervals, each formed of field intervals, and said different line intervals are in the same field interval.

51. The apparatus of claim 49 wherein said video signal contains frame intervals, each formed of field intervals, and said different line intervals are in different field intervals of the same frame interval.

52. The apparatus of claim 46 wherein said video signal contains line intervals and said copyright information and said copy generation information are superposed in VBID data in the same line interval.

53. The apparatus of claim 46 wherein said copy generation signal is a plural bit signal.

54. Apparatus for reproducing a video signal having an effective picture portion and a non-picture portion and containing copy protection information representing whether a video picture derived from said video signal is subject to copyright and whether successive generations of copies can be made from said video signal, said apparatus comprising means for playing back said video signal from a record medium; means for detecting said copy protection information in the played back video signal; means for generating copyright information data indicative of whether said video picture is subject to copyright; means for generating copy generation data indicative of the number of successive generations of copies that can be made from said played back video signal; means for setting both said copyright information data and said copy generation data as predetermined bits of plural-bit data flags which are associated with and classified by a plural-bit mode number, said plural-bit data flags and plural-bit mode number being included in vertical blanking identifying (VBID) data, and said predetermined bits being used to represent other information as a function of the classification of said plural-bit data flags by said plural-bit mode number; and disposing said VBID data in the non-picture portion of said played back video signal.

55. The apparatus of claim 54 wherein said video signal contains line intervals and said copyright information data and said copy generation data are superposed in VBID data in respectively different line intervals.

56. The apparatus of claim 55 wherein said video signal contains frame intervals, each formed of field intervals, and said different line intervals are in the same field interval.

57. The apparatus of claim 55 wherein said video signal contains frame intervals, each formed of field intervals, and said different line intervals are in different field intervals of the same frame interval.

58. The apparatus of claim 54 wherein said video signal contains line intervals and said copyright information data and said copy generation data are superposed in VBID data in the same line interval.

59. The apparatus of claim 54 wherein said copy generation signal is a plural bit signal.

60. The apparatus of claim 54 wherein said copy protection information comprises recorded copyright information data and recorded copy generation data, both included in VBID data in the non-picture portion of the video signal on said record medium, and said means for detecting is operable to detect both said copyright information data and copy generation data in the played back video signal; and said means for setting is operable to set as said predetermined bits the detected copyright information data and copy generation data in the VBID data of said played back video signal.

* * * * *